(12) United States Patent
Yamauchi

(10) Patent No.: US 8,510,384 B2
(45) Date of Patent: Aug. 13, 2013

(54) MULTICAST DISTRIBUTION SYSTEM AND METHOD

(75) Inventor: Kazushi Yamauchi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 12/649,512

(22) Filed: Dec. 30, 2009

(65) Prior Publication Data

US 2010/0106779 A1    Apr. 29, 2010

Related U.S. Application Data

(63) Continuation of application No. PCT/JP2007/063963, filed on Jul. 13, 2007.

(51) Int. Cl.
*G06F 15/16* (2006.01)
*G06F 15/177* (2006.01)
*G06F 9/44* (2006.01)

(52) U.S. Cl.
USPC .......................... 709/205; 709/221; 717/168

(58) Field of Classification Search
USPC ...................................................... 709/221
See application file for complete search history.

(56) References Cited

U.S. PATENT DOCUMENTS

| | | | | |
|---|---|---|---|---|
| 6,718,361 B1 * | 4/2004 | Basani et al. | | 709/201 |
| 2002/0178235 A1 | 11/2002 | Ueno et al. | | |
| 2012/0155566 A1 * | 6/2012 | Khan et al. | | 375/295 |

FOREIGN PATENT DOCUMENTS

| | | |
|---|---|---|
| CN | 1384649 | 12/2002 |
| EP | 1 259 027 | 11/2002 |
| JP | 2002-335281 | 11/2002 |
| JP | 2003-69639 | 3/2003 |
| JP | 2004-253975 | 9/2004 |

OTHER PUBLICATIONS

International Search Report for PCT/JP2007/063963, mailed Aug. 7, 2007.
"Proposal and Analysis of Multicast Communication Method over the Department VPN," Minoru Kamata et al., The Transactions of the Institute of Electronics, Information and Communication Engineers B, vol. J82-B, No. 11, pp. 2061-2073, Nov. 25, 1999.
"Design and Implementation of Multicast Servers over the Internet," Norihiro Ishikawa, Information Processing Society of Japan Kenkyu Hokoku 97-DPS-81-12, pp. 67-72, Feb. 27, 1997.

* cited by examiner

*Primary Examiner* — Lynn Feild
*Assistant Examiner* — Bryan Lee
(74) *Attorney, Agent, or Firm* — Staas & Halsey LLP

(57) ABSTRACT

A network composed of a primary segment, in which a management server, a primary distribution server, and a data storage server are disposed, and a secondary segment, in which a plurality of targets connected to the primary segment via a router which does not support multicast, serves as an object. When a multicast distribution request is received at the management server, a secondary distribution server is temporarily built and operated on a particular target of the secondary segment, data is transmitted by unicast from the data storage server to the secondary distribution server via the router, and the data is transmitted by multicast from the secondary distribution server to the targets on the same segment.

20 Claims, 19 Drawing Sheets

FIG. 4

| SEGMENT | TARGET URL | DISTRIBUTION SERVER ACTIVATION AGENT |
|---|---|---|
| SG001 | aaaa.aaaa.aaaa | 1 |
| | aaaa.aaaa.bbbb | 0 |
| | aaaa.aaaa.cccc | 0 |
| SG002 | bbbb.bbbb.aaaa | 1 |
| | bbbb.bbbb.bbbb | 0 |
| | bbbb.bbbb.cccc | 0 |
| SG003 | cccc.cccc.aaaa | 1 |
| | cccc.cccc.bbbb | 0 |
| | cccc.cccc.cccc | 0 |

40

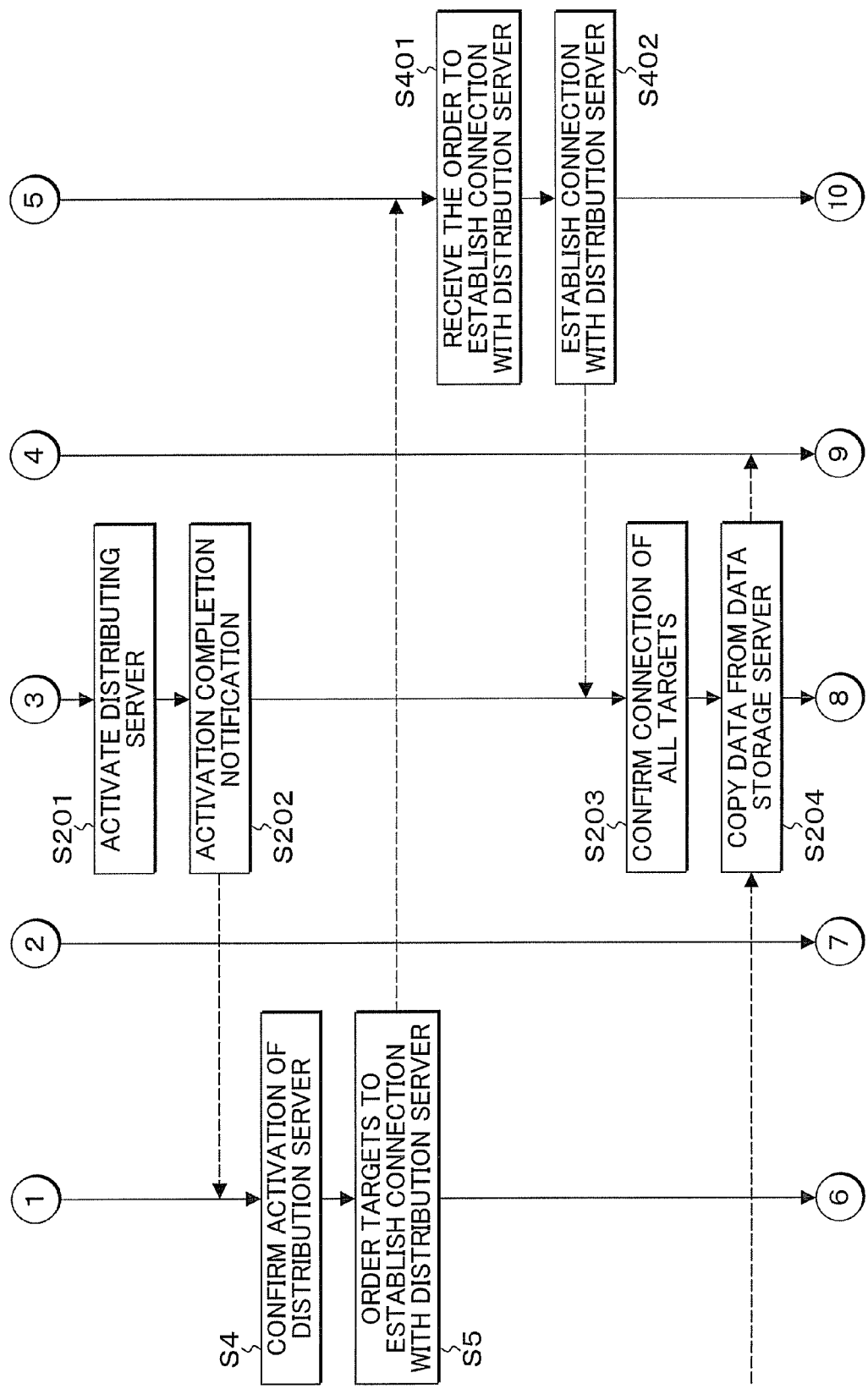

MULTICAST DISTRIBUTION SYSTEM AND METHOD

This application is a continuation of International application PCT/JP2007/063963, filed Jul. 13, 2007.

BACKGROUND OF THE INVENTION

1. Field of the Invention

The present invention relates to a multicast distribution system and method which distribute data to a plurality of targets by multicast and, particularly, relates to a multicast distribution system and method which distribute data to a plurality of targets by multicast beyond a router.

2. Description of the Related Art

Conventionally, multicast distribution is used for installing software or the like on a large number of computers connected by a network; and, recently, even in the multicast distribution beyond a router wherein network environments have become complex, it is required not to deteriorate performance.

FIG. 1 shows a block diagram of a conventional system of multicast distribution beyond a router. In FIG. 1, a management server 106 and a distributions server 108, which are operated by a same computer, are connected to a segment 100, and a data storage server 110 and targets 114-01 and 114-02, for which multicast distribution is carried out, are also connected to the segment 100. Other segments 104-1 to 104-3 are connected to the segment 100 via a router 102, and targets 114-11, 114-12, 114-21, 114-22, 114-31, 114-32 serving as objects of multicast distribution are connected to the segments, respectively. Note that 112-1 to 112-3 are terminal devices. When targets are present in the segments different from that of the distribution server 108 disposed in the segment 100, in other words, when the targets 114-11 to 114-32 are present in the other segments 104-1 to 104-3, data of multicast is transmitted to the targets 114-11 to 114-32 via the router 102 supporting multicast. When the router 102 supporting multicast receives data packets which have multicast addresses as destinations, the router generates copies thereof respectively for the segments 104-1 to 104-3, in which the targets serving as the objects of multicast are present, and transmits the copy packets to the segments 104-1 to 104-3. An operation of conventional multicast distribution will be explained as below. When the management server 106 is requested to distribute data by multicast, the management server 106 activates the distribution server 108. Subsequently, the management server 106 orders each of the targets 114-11 to 114-32, which are registered in a multicast distribution group, to establish connection to the distribution server 108. When all of the targets 114-11 to 114-32 are connected to the distribution server 108, multicast distribution is started. When the multicast distribution is terminated, the targets 114-01 to 114-32 cancel the connection with the distribution server. Then, the management server 106 terminates the distribution server 108, and the multicast distribution is terminated. Note that Patent Documents 1 and 2 are related art. Among these, Patent Document 1 discloses a technique called tunneling for carrying out multicast distribution via a router that does not support multicast.

Patent Document 1: Japanese Laid-Open Patent Publication No. 2004-253975

Patent Document 2: Japanese Laid-Open Patent Publication No. 2003-069639

However, in such a conventional multicast distribution system, there is a problem that distribution performance is deteriorated in the network environment in which a distribution server and targets are mutually connected via a multicast-supporting router, compared with the network environment in which a distribution server and targets are in the same segment without intermediation of the router. This is for the reason that packets are copied by the number of segments in the multicast-supporting router. Moreover, in order to control the packets for multicast distribution, there are also problems that a normal router supporting unicast cannot be used, a high-performance expensive router supporting multicast has to be used, and labor hours and time are taken since setting for carrying out multicast distribution control has to be carried out in the multicast-supporting router.

SUMMARY OF THE INVENTION

According to the present invention to provide a multicast distribution system and method which enable high-speed distribution of data by multicast to other segments which are connected via a router without using a multicast-supporting router.

(System)

The present invention provides a multicast distribution system. The multicast distribution system of the present invention is characterized by having a network comprising a primary segment, in which a management server, a primary distribution server, and a data storage server are disposed, and a secondary segment, in which a plurality of targets connected to the primary segment via a router are disposed;

an agent operating unit provided in any one of the plurality of targets disposed in the secondary segment and building and operating an agent;

a distribution server activating unit provided in the agent and building and activating a secondary distribution server on the target based on a distribution server activating file, which is requested to and received from the management server, when a distribution server activating command is received from the management server;

a distribution server connection ordering unit provided in the management server and transmitting a distribution server connection command to a plurality of the targets except for the target, in which the agent is built, when an activation completion notification is received from the secondary distribution server;

a distribution server connecting unit provided in each of the plurality of targets and establishing connection with the secondary distribution server when the distribution server connection command is received from the management server; and a multicast distribution unit provided in the secondary distribution server, acquiring and temporarily retaining data from the data storage server when connection of all of the plurality of targets is confirmed, and then distributing the data to the plurality of targets by multicast.

Herein, the management server registers and manages agent management information representing the target, in which the agent is built, for each of one or a plurality of the secondary segment, recognizes the target, in which the agent is built, according to the agent management information when a multicast distribution request is received, and transmits the distribution server activating command to the target.

When the agent is present on a plurality of the targets disposed in the secondary segment, the management server registers and manages the target, which is autonomously determined based on exchange of information of the plurality of targets, in the agent management information as a transmission destination target of the distribution server activating command.

The target having highest CPU (Central Processing Unit) performance, the target having a highest memory capacity, or the target having a highest priority set by a user in advance is determined as the transmission destination target of the distribution server activating command.

The primary distribution server is built and operated on a same computer as the management server.

The distribution server connecting unit is provided in each of the plurality of targets except for the target in which the agent is provided.

The multicast distribution unit repeats, up to last divided data, a process of sequentially acquiring divided data, which is obtained by dividing distribution data, from the data storage server, temporarily retaining the data, and then distributing the data to the plurality of targets by multicast.

The multicast distribution unit may acquire all the data distributed from the data storage server, temporarily retain the data, and then distribute the data to the plurality of targets by multicast.

The router is a unicast-supporting router not supporting multicast.

(Method)

The present invention provides a multicast distribution method. The present invention is a multicast distribution method having a network configuration having a primary segment, in which a management server, a primary distribution server, and a data storage server are disposed, and a secondary segment, in which a plurality of targets connected to the primary segment via a router are disposed, the method distributing data of the data storage server to the plurality of targets by multicast without intermediation of the router, the multicast distribution method characterized by including:

an agent operating step of building and operating an agent in any one of the plurality of targets disposed in the secondary segment;

a distribution server activating step of transmitting a distribution server activating command from the management server to the agent and transmitting a distribution server activating file in response to a request from the agent so as to build and activate a secondary distribution server on the target;

a target connection step of transmitting a command to establish connection with the secondary distribution server to the plurality of targets except for the target, in which the agent is built, when the management server receives an activation completion notification from the secondary transmission server; and a multicast distribution step of acquiring and temporarily retaining data from the data storage server when connection of all of the plurality of targets is confirmed by the secondary distribution server and then distributing the data to the plurality of targets by multicast.

According to the present embodiment, when data is to be distributed by multicast from a primary segment, in which a primary distribution server is disposed, to a plurality of targets present in a different secondary segment via a router which does not support multicast, an agent temporarily builds and activates a secondary distribution server in the computer of the target, in which the agent is operating. Thus, the secondary distribution server acquires data via the router by unicast from the data storage server disposed in the primary segment, which is different from the segment of the secondary distribution server, temporarily stores the data, and distributes the temporarily-stored data by multicast in response to the connection of the targets which are present in the same secondary segment. Therefore, multicast packets are not required to pass through the router, a high-performance and expensive router which supports multicast is not required to be used, an existing router which is inexpensive in terms of cost, already widely used, and supporting unicast can be used without change, the problem of distribution speed reduction caused when data passes through the multicast-supporting router can be solved, and high-speed distribution can be achieved.

BRIEF DESCRIPTION OF THE DRAWINGS

FIG. 4 is an explanatory diagram of a multicast management table provided in the management server of the present embodiment;

FIGS. 6A, 6B, and 6C are time, charts showing a multicast distribution process according to the present embodiment;

DETAILED DESCRIPTION OF THE PREFERRED EMBODIMENTS

Figure 1:
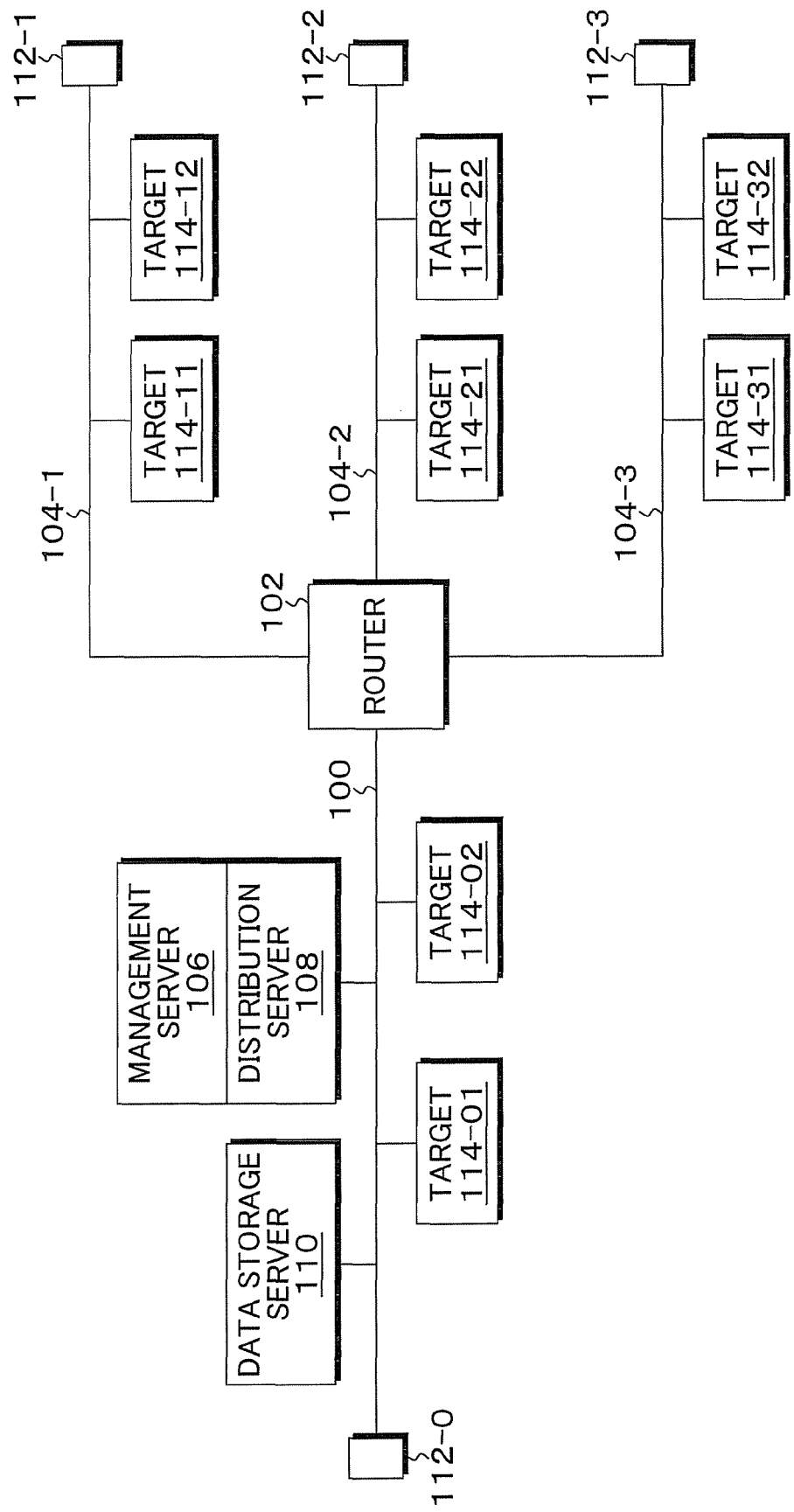
FIG. 1 is a block diagram of a conventional system which distributes multicast packets via a router.
Figure 2A:
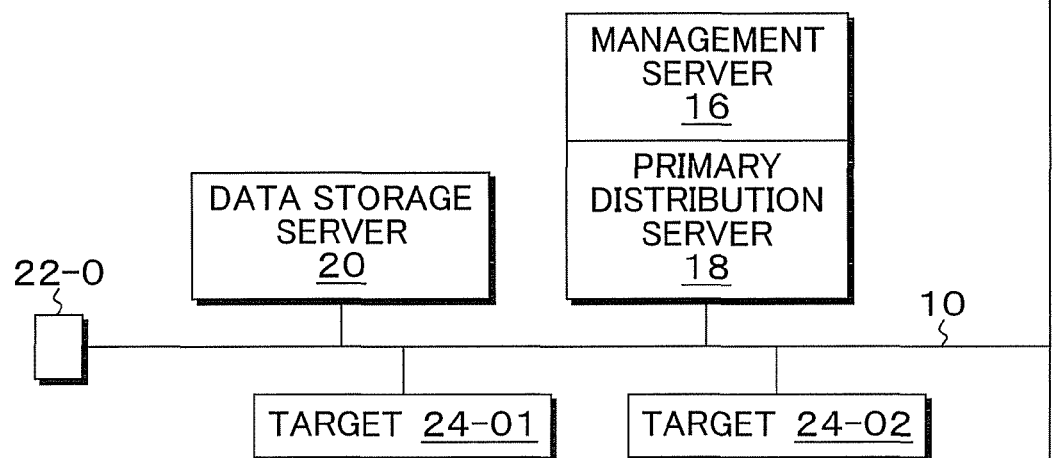
FIGS. 2A and 2B are block diagrams showing an embodiment of a multicast distribution system according to the present embodiment.
Figure 2B:
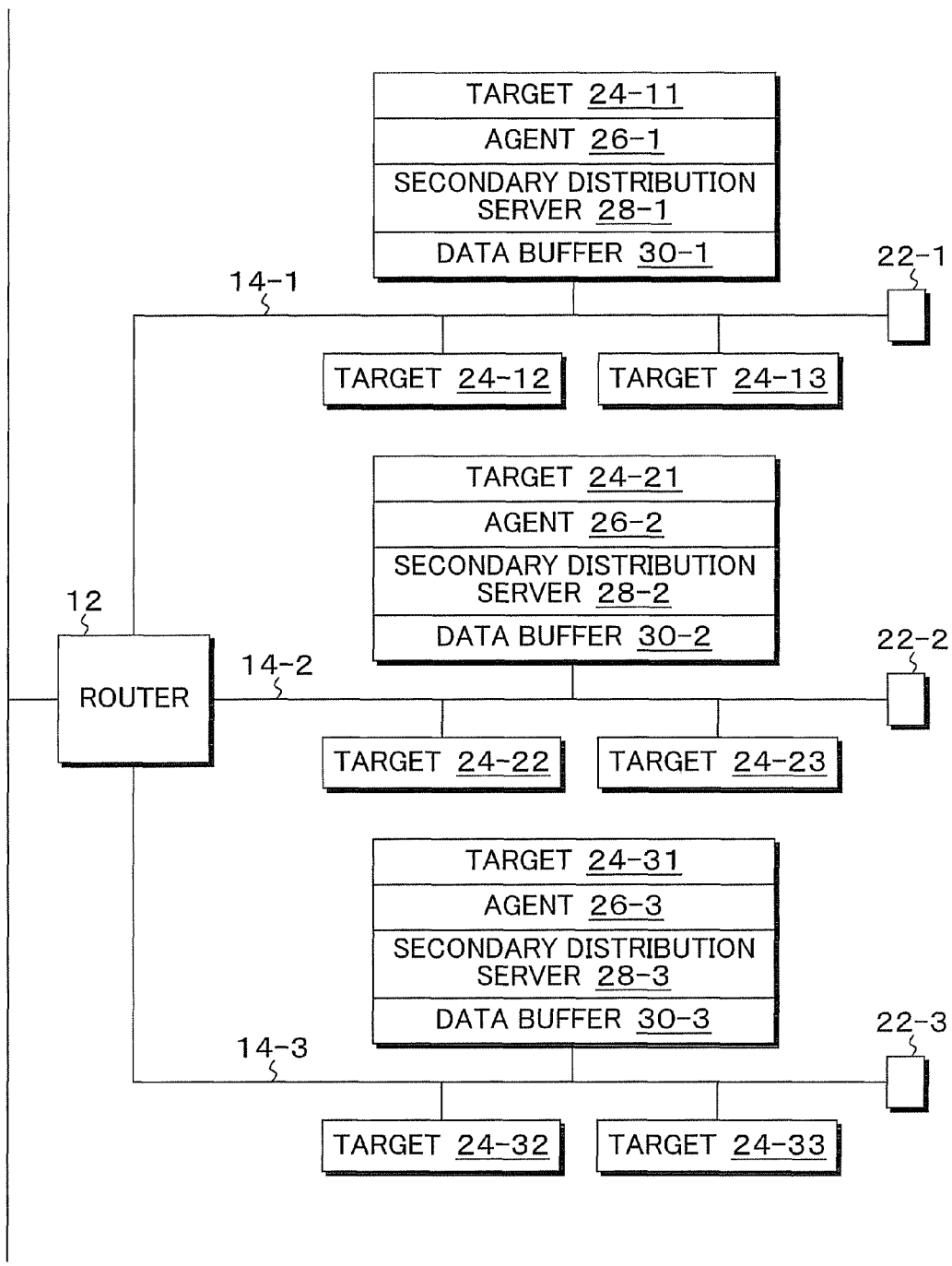

FIGS. 2A and 2B are explanatory diagrams showing an embodiment of a multicast distribution system according to the present invention. In FIGS. 2A and 2B, a management server 16 and a primary distribution server 18 are operated on a same computer and connected to a primary segment 10. A data storage server 20 and targets 24-01 and 24-02, which serve as distribution objects of multicast, are connected to the primary segment 10. A terminal device 22-0 is connected to an end of the primary segment 10. For example, three secondary segments 14-1, 14-2, and 14-3 are connected to the primary segment 10 via a router 12, and terminal devices 22-1, 22-2, and 22-3 are connected to the ends thereof, respectively. The router 12 of the present embodiment does not support multicast, and a normal unicast-supporting router is used therefor. Therefore, even when multicast packets are transmitted from the primary distribution server 18, the multicast packets cannot be transmitted to the secondary segments 14-1, 14-2, and 14-3 through the router 12. Targets 24-11 to 24-13, 24-21 to 24-23, and 24-31 to 24-33 are respectively connected to the secondary segments 14-1, 14-2, and 14-3, which are connected to the primary segment 10 via the router 12. For example, when the secondary segment 14-1 is taken as an example among them, an agent 26-1 which can be remotely activated is operably built, among the three targets 24-11 to 24-13, for example, in the target 24-11 on the same computer as that of the target 24-11.

Specifically, a program which realizes the agent 26-1 is loaded on the computer in which the target 24-11 is installed; and, when the computer of the target 24-11 is activated, the agent 26-1 is also activated and operated on the same computer. As the method that causes the agent 26-1 to 26-3 to be present in the same computers as those of the targets 24-11 to 24-31 connected to the secondary segments 14-1 to 14-3 of FIGS. 2A and 2B, for example, the targets and the agents can be caused to be present in the same computers by the next methods.

(1) As a service operation, an agent program is installed in advance in the computer (containing the target) which is in the same segment as that of the target serving as a multicast distribution object, so that the state in which the agent is installed in the particular target is always maintained.

(2) The already-activated computer (containing the target) which is in the same segment as the target serving as a distribution object of multicast is once shut down, an OS such as WinPE (R) which is temporarily used is activated by PXE booting, and the agent is operated on the OS. In this method, the agent program is not required to be installed in advance in the target serving as an object. Regarding the secondary segment 14-2, an agent 24-2 is similarly built in the target 24-21 which is one of the three targets 24-21 to 24-23. Furthermore, regarding the secondary segment 14-3, an agent 26-3 is built in the target 24-31 which is one of the three targets 24-31 to 24-33. When a multicast distribution request for transmitting information such as a program is generated by an operator operation or the like with respect to the management server 16 disposed in the primary segment 10, the targets 24-11 to 24-31, in which the agents 26-1 to 26-3 of the secondary segments 14-1 to 14-3 are respectively disposed, receive distribution server activating commands respectively by the agents 26-1 to 26-3 from the management server 16, receive distribution server activating files (distribution server activating component information) from the management server 16, and build and activate secondary distribution servers 28-1, 28-2, and 28-3 on the respective computers of the targets 24-11 to 24-31 based on the distribution server activating files. The secondary distribution servers 28-1 to 28-3 are respectively provided with data buffers 30-1, 30-2, and 30-3 which are temporary storage locations of the data distributed by multicast. When the secondary distribution servers 28-1 to 28-3 are normally activated, the secondary distribution servers transmit activation completion notifications to the management server 16. When the management server 16 confirms the activation completion notifications from all the secondary distribution servers 28-1 to 28-3, the management server transmits a distribution server connection command to each of all the targets which are registered as the distribution objects of multicast in advance, more specifically, to each of the targets 24-01 and 24-02 of the primary segment 10 and the targets 24-12, 24-13, 24-22, 24-23, 24-32, and 24-33 except for the targets 24-11 to 24-31 in which the agents 26-1 to 26-3 in the secondary segment 14-1 to 14-3-side are disposed. The targets 24-01 and 24-02 disposed in the primary segment 10 as well as the primary distribution server are connected to the primary distribution server 18 based on the distribution server connection command as well as conventional multicast distribution, acquire multicast data packets, which are transmitted from the data storage server 20, based on a multicast address (group address), and store the packets in the hard disk drives of themselves. Meanwhile, the targets 24-12 and 24-13, 24-22 and 24-23, and 24-32 and 24-33 connected to the secondary segments 14-1 to 14-3 are respectively connected to the secondary distribution servers 28-1, 28-2, and 28-3 which are connected in the same segment based on the distribution server connection commands. When the secondary distribution servers 28-1 to 28-3 confirm the connection from all the targets which are connected on the same segments and serving as the distribution objects of the multicast, the secondary distribution servers acquire data from the data storage server 20, which is disposed in the primary segment 10, via the router 12 by unicast, temporarily store the data in the data buffers 30-1, 30-2, and 30-3, respectively, and then distribute the data, which is temporarily retained on the secondary segments 14-1 to 14-3, by multicast. With respect to the multicast traffic generated along with the transmission of the multicast data packets to the secondary segments 14-1 to 14-3, the respective targets 24-12 and 24-13, 24-22 and 24-23, and 24-32 and 24-33 monitor (listen) the multicast addresses (group addresses) for the segments and, when the multicast addresses are recognized, retrieve and save the packet in the hard disk drives of themselves. Herein, for example, when Internet Protocol version 4 (IPv4) is taken as an example, multicast addresses (group addresses) are the addresses within the range of 224.0.0.0 to 239.255.255.255 of the class D defined by setting the first 4 bits of a 28-bit address to 1110. Among them, the multicast addresses within the range of 224.0.0.0 to 224.0.0.255 are allocated to the addresses used in the multicast inside the segments. Therefore, regarding the targets 24-12, 24-13, 24-22, 24-23, 24-32, and 24-33 disposed in the secondary segments 14-1 to 14-3 of the present embodiment and serving as distribution objects of multicast, the inside-segment multicast addresses are set in advance; and, when a data packet in which the predetermined inside-segment multicast address is set is transmitted from the secondary distribution server 28-1, the respective object targets can retrieve the packet having the inside-segment multicast address and receive and acquire the data which is temporarily retained in the data buffer 30-1 of the secondary distribution server 28-1.

Figure 3A:
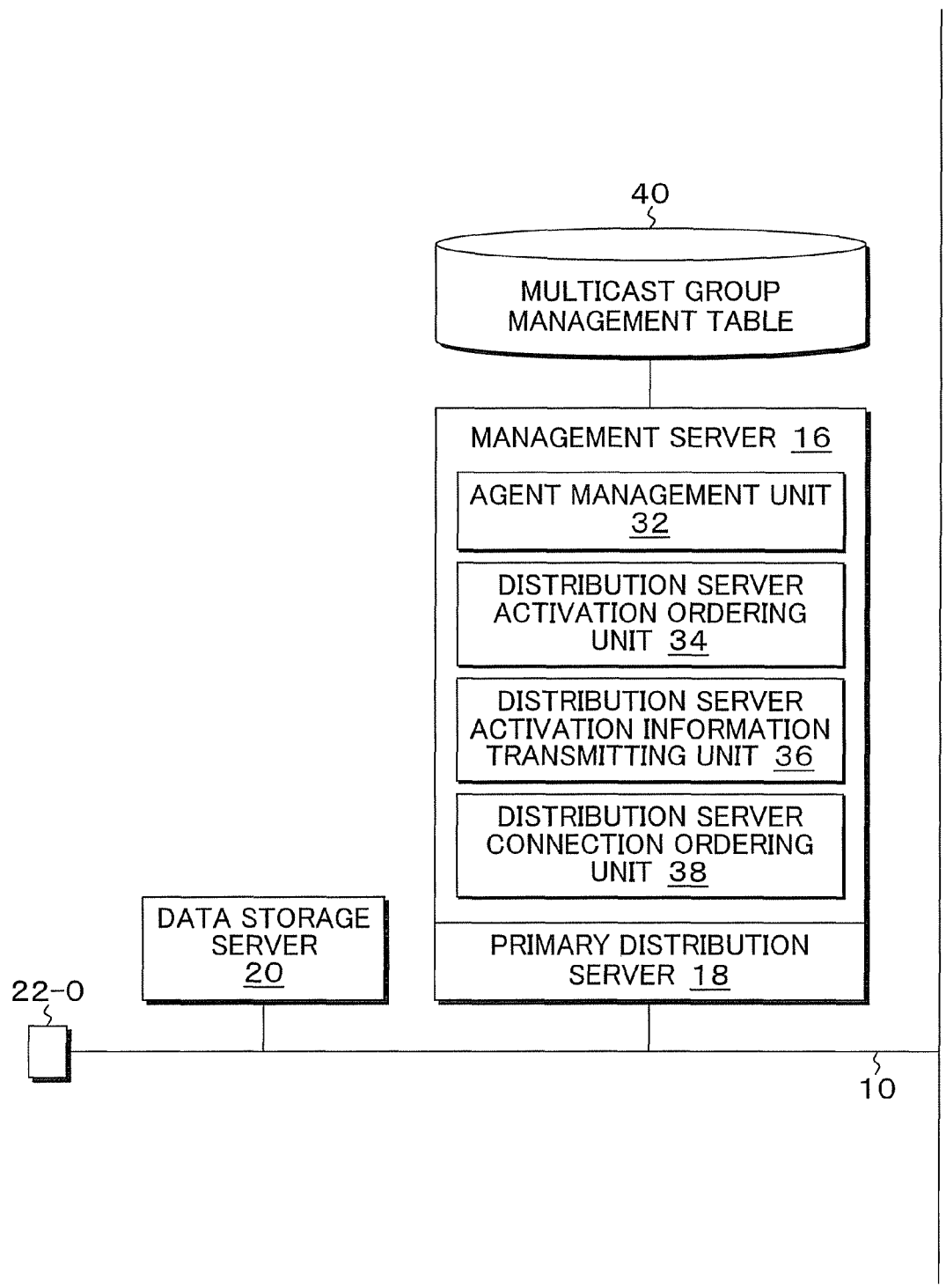
FIGS. 3A and 3B are block diagrams showing a functional configuration of a management server and targets in the present embodiment.
Figure 3B:
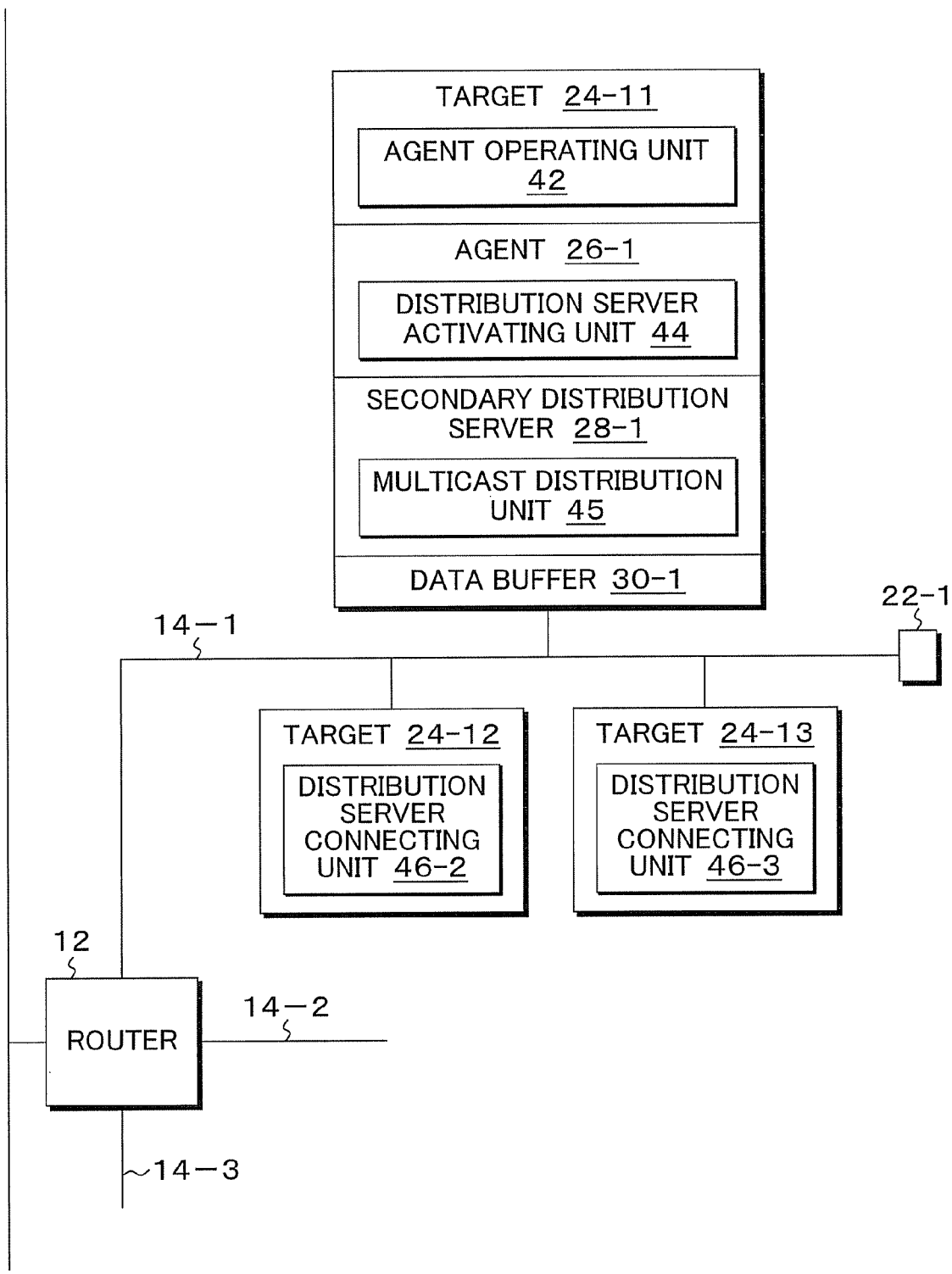

FIGS. 3A and 3B are block diagrams showing a functional configuration of the management server and the targets in the present embodiment. Herein, FIGS. 3A and 3B focus on and show the targets 24-11 to 24-13 connected to the secondary segment 14-1, which is connected to the management server 16 provided in the primary segment 10 of FIGS. 2A and 2B, the primary distribution server 18, and the data storage server 20 via the router 12. In the management server 16 provided in the primary segment 10-side, an agent management unit 32, a distribution server activation ordering unit 34, a distribution server activation information transmitting unit 36, and a distribution server connection ordering unit 38 are provided. In addition, a multicast group management table 40 is provided for the management server 16 and manages the targets, which serve as the distribution objects of multicast, together with segment information. Meanwhile, the agent 26-1 is disposed in the target 24-11 among the targets 24-11 to 24-13 connected to the secondary segment 14-1, which is connected via the router 12, the agent 26-1 is activated and operated on the same computer as that of the target 24-11, and the agent 26-1 is provided with the function of an agent operating unit 42 so as to build and operate the agent 26-1. The agent 26-1 is provided with the function of a distribution server activating unit 44. When the distribution server activating command is received from the distribution server activation ordering unit 34 provided in the management server 16, the distribution server activating unit 44 requests the distribution server activating file to the distribution server activation information transmitting unit 36 of the management server 16 and builds and activates the secondary distribution server 28-1 on the target 24-11 based on the distribution server activating file received from the management server 16 based on the request. When normally activated, the secondary distribution server 28-1 transmits the activation completion notification to the management server 16. Meanwhile, the management server 16 of the primary segment 10-side is provided with the distribution server connection ordering unit 38. When the activation completion notification is received from the secondary distribution server 28-1 of the secondary segment 14-1 side, the distribution server connection ordering unit 38 transmits the distribution server connection commands to the other targets 24-12 and 24-13 of the same segment except for the target 24-11 provided with the agent 26-1. FIGS. 3A and 3B focus on the secondary segment 14-1 connected via the router 12. However, when the activation completion notifications are received from all the secondary distribution servers 28-1 to 28-3 shown in FIGS. 2A and 2B provided in the secondary segments 14-1 to 14-3 via the router 12 and activation completion thereof is confirmed, the distribution server connection ordering unit 38 of the management server 16 transmits distribution server connection commands respectively to the targets connected to the secondary segments 14-1 to 14-3, except for the ones in which the agents are disposed. The targets 24-12 and 24-13 serving as the multicast distribution objects connected to the secondary segment 14-1 are provided with distribution server connecting units 46-2 and 46-3. When the distribution server connection commands are received from the management server 16 via the router 12, the distribution server connecting units 46-2 and 46-3 establish connection with the secondary distribution server 28-1 of the target 24-11 connected to the same segment. The secondary distribution server 28-1 is provided with the function of a multicast distribution unit 45. When the connection of all the targets 24-12 and 24-13 connected to the same segment is confirmed, the multicast distribution unit 45 acquires the data, which serves as a multicast distribution object, from the data storage server 20 connected to the primary segment 10 via the router 12 by unicast distribution, temporarily retains the data in the data buffer 30-1, then transmits the data retained in the data buffer 30-1 to the secondary segment 14-1 by a packet in which the inside-segment multicast address is set, and subjects the packet to multicast distribution to each of the targets 24-12 and 24-13, so as to cause the packet to be stored in the hard disk drives in the interiors thereof. FIG. 4 is an explanatory diagram of the multicast group management table provided in the management server 16 shown in FIGS. 3A and 3B of the present embodiment.

In FIG. 4, in the multicast group management table 40, three items, i.e., segments, target URLs, and distribution server activating agents are registered. The segments are the identification information representing the secondary segments 14-1 to 14-3 connected to the primary segment 10, in which the management server 16 is present, via the router 12. For example, corresponding to the secondary segments 14-1 to 14-3, SG001, SG002, and SG003 are registered as the segment identification information. As the target URLs next to them, the URLs which are the IP addresses of the targets 24-11 to 24-33 connected to the secondary segments 14-1 to 14-3 are registered. Furthermore, as the distribution server activating agents, the flag information for specifying the targets for which the agents 26-1 to 26-3 are disposed among the target URLs registered for the segments is set. The flags of the distribution server activating agents are valid at flag 1 and invalid at 0, and it can be understood that the agents are disposed at the valid targets. Therefore, when the multicast distribution request is received, the management server 16 can transmit the distribution server activating commands to the respective agents 26-1 to 26-3 by referencing the multicast group management table 40 and using the target URLs, for which flag 1 is set as the distribution server activating agents in the segments, as the destinations. Also, regarding the distribution server connection commands with respect to the targets in the case in which the management server 16 receives the activation completion notifications from the secondary distribution servers 28-1 to 28-3 built and activated in the secondary segments 14-1 to 14-3, the distribution server connection commands can be transmitted by referencing the multicast group management table 40 and using the target URLs of the segments for which the flag of the distribution server activating agent is 0.

Figure 5:
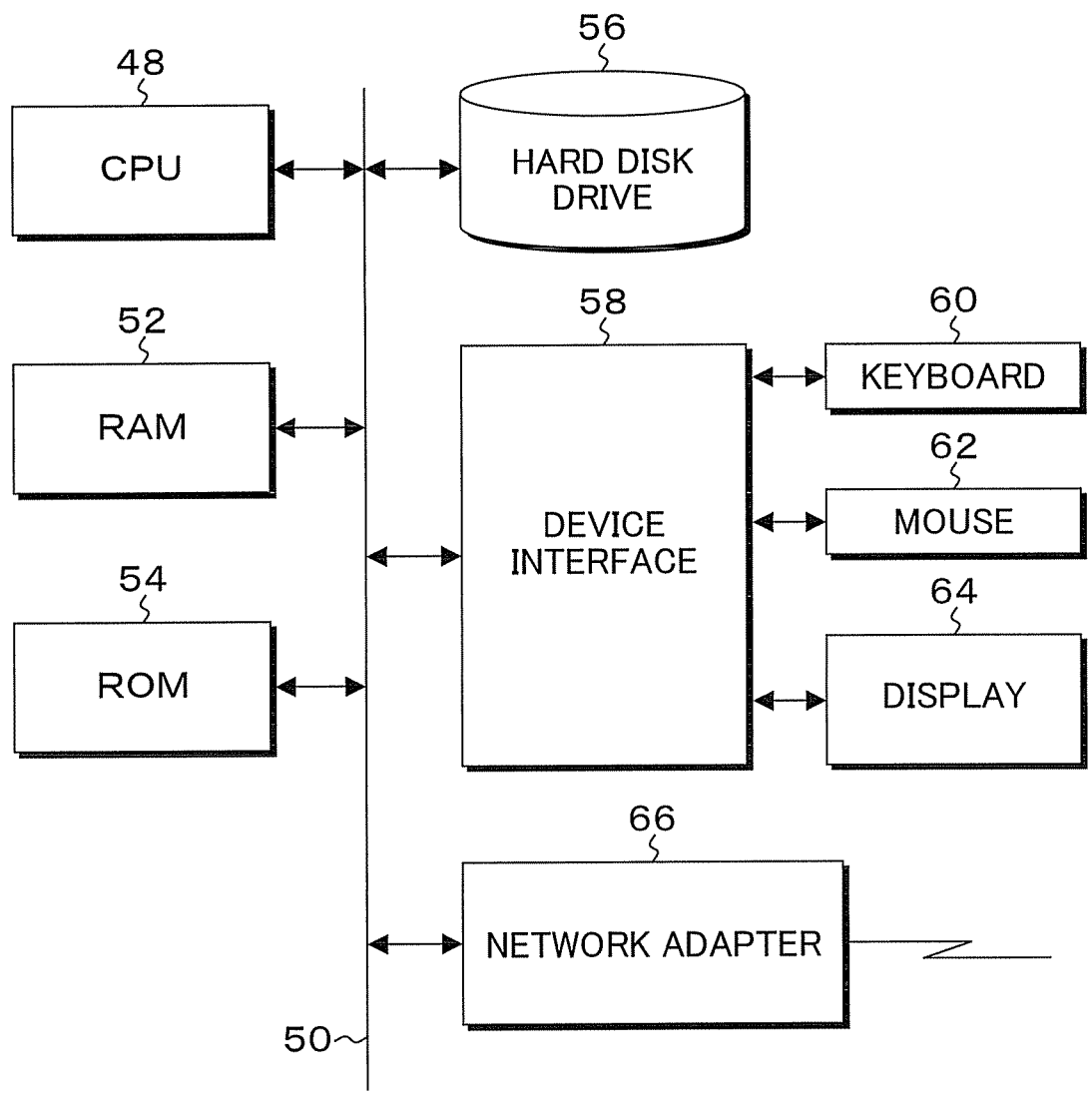
FIG. 5 is a block diagram showing a hardware configuration of each of the computers used as the management server, data distribution server, and targets of the present embodiment.

FIG. 5 is a block diagram showing a hardware configuration of each of the computers used by the management server, the data distribution server, and the targets of the present embodiment. In FIG. 5, in the computer used in the present embodiment, a RAM 52; a ROM 54; a hard disk drive 56; a device interface 58 connected to a keyboard 60, a mouse 62, and a display 64; and a network adapter are connected to a bus 50 of a CPU 48. Programs for realizing the processing functions of the management server 16, the primary distribution server 18, the data storage server 20, or the target are installed in the hard disk drive 56. When the computer is activated, after initialization by BIOS and self-diagnosis is carried out, an OS is read from the hard disk drive 56 and located on the RAM 52 by executing boot code at the top of the ROM 54. When the OS is executed by the CPU 48, the programs, which are installed in each computer and used in multicast distribution, are read from the hard disk drive 56, located on the RAM 52, and executed by the CPU 48.

Figure 6A:
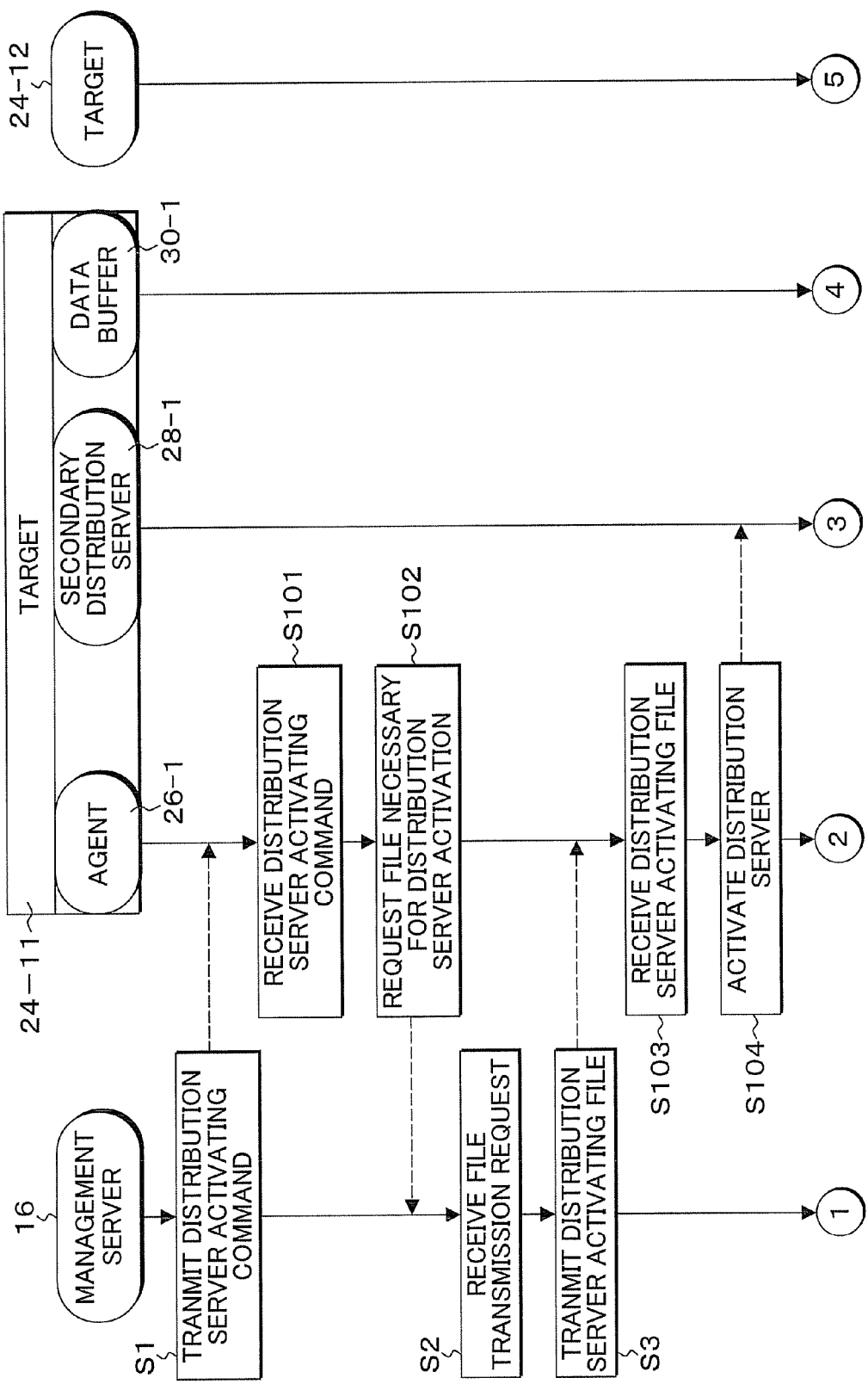
Figure 6C:
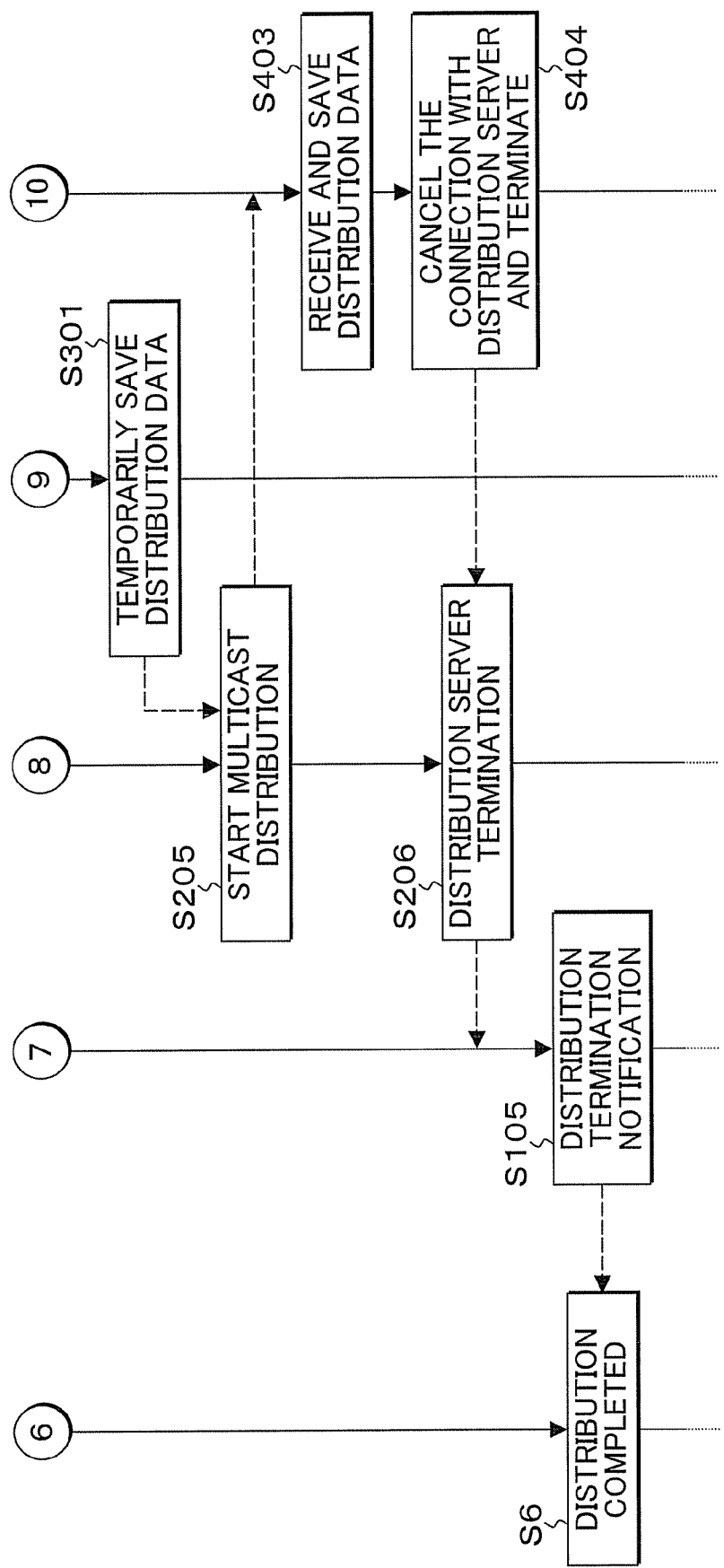

FIGS. 6A, 6B, and 6C are time charts showing multicast distribution processes according to the present embodiment, wherein, as shown in FIGS. 3A and 3B, the targets 24-11 and 24-12 disposed in the secondary segment 14-1 side connected from the primary segment 10 via the router 12 are shown, and the target 24-13 is omitted. In FIGS. 6A, 6B, and 6C, when a multicast distribution request is generated by an operator operation or the like at the management server 16, the distribution server activating command is transmitted to the agent 26-1, which is operated on the target 24-11 of the secondary segment 14-1, in step S1. When the distribution server activating command from the management server 16 is received in step S101, the agent 26-1 requests the file which is preferable for distribution server activation to the management server 16 in step S102. When the transmission request of the file preferable for activation of the distribution server is received from the agent 26-1 in step S2, the management server 16 transmits the distribution server activating file thereto in step S3. When the distribution server activating file is received from the management server 16 in step S103, the agent 26-1 copies the received distribution server activating file onto the RAM of the computer and executes the file by the CPU in step S104, thereby activating the secondary distribution server 28-1 in step S201. When the secondary distribution server 28-1 is normally activated, the secondary distribution server transmits the activation completion notification to the management server 16 in step S202. When the management server 16 confirms the activation of the distribution server and confirms the activation completion notifications of the secondary distribution servers operated in all the segments serving as the distribution objects of multicast in step S4, the management server transmits the connection commands for the distribution servers to all the targets serving as the distribution objects of multicast in step S5. In response to this, the target 24-12 receives the command to establish connection with the distribution server from the management server 16 in step S401 and establish connection with the secondary distribution server 28-1 of the target 24-11, which is disposed in the same segment, in step S402. When connection of all the targets within the same segment is confirmed, the secondary distribution server 28-1 receives (copies) the data, which serves as the distribution object, from the data storage server 20, which is disposed in the primary segment 10 as well as the management server 16, by unicast distribution in step S204 and temporarily saves the received distribution data in the data buffer 30-1 as shown in step S301. Subsequently, in step S205, the secondary distribution server 28-1 reads the distribution data retained in the data buffer 30-1 and transmits multicast data packets in which the inside-segment multicast address is set, thereby starting multicast distribution. As is elucidated in later explanations, the multicast distribution in the present embodiment includes a method that divides the distribution data by the size designated by the management server 16 and sequentially subjects the divided data to multicast transmission while maintaining synchronization with the target 24-12 side, and a method that acquires all the data at one time, temporarily retains the data, and then subjects all the data to multicast distribution. When the multicast distribution by the secondary distribution server 28-1 is started in step S205, the target 24-12 receives the distribution data and saves the data in the hard disk drive of its own in step S403. When reception of the distribution data is completed, the connection with the secondary distribution server 28-1 is cancelled, and the process is terminated in step S404. When the connection cancellation of all the currently-connected targets which are in the same segment is confirmed in step S206, the secondary distribution server 28-1 terminates the operation of the distribution server. When termination of the secondary distribution server 28-1 is confirmed, the agent 26-1 transmits a distribution termination notification to the management server 16 in step S105. In response to this, the management server 16 completes the series of distribution processes in step S6.

Figure 7:
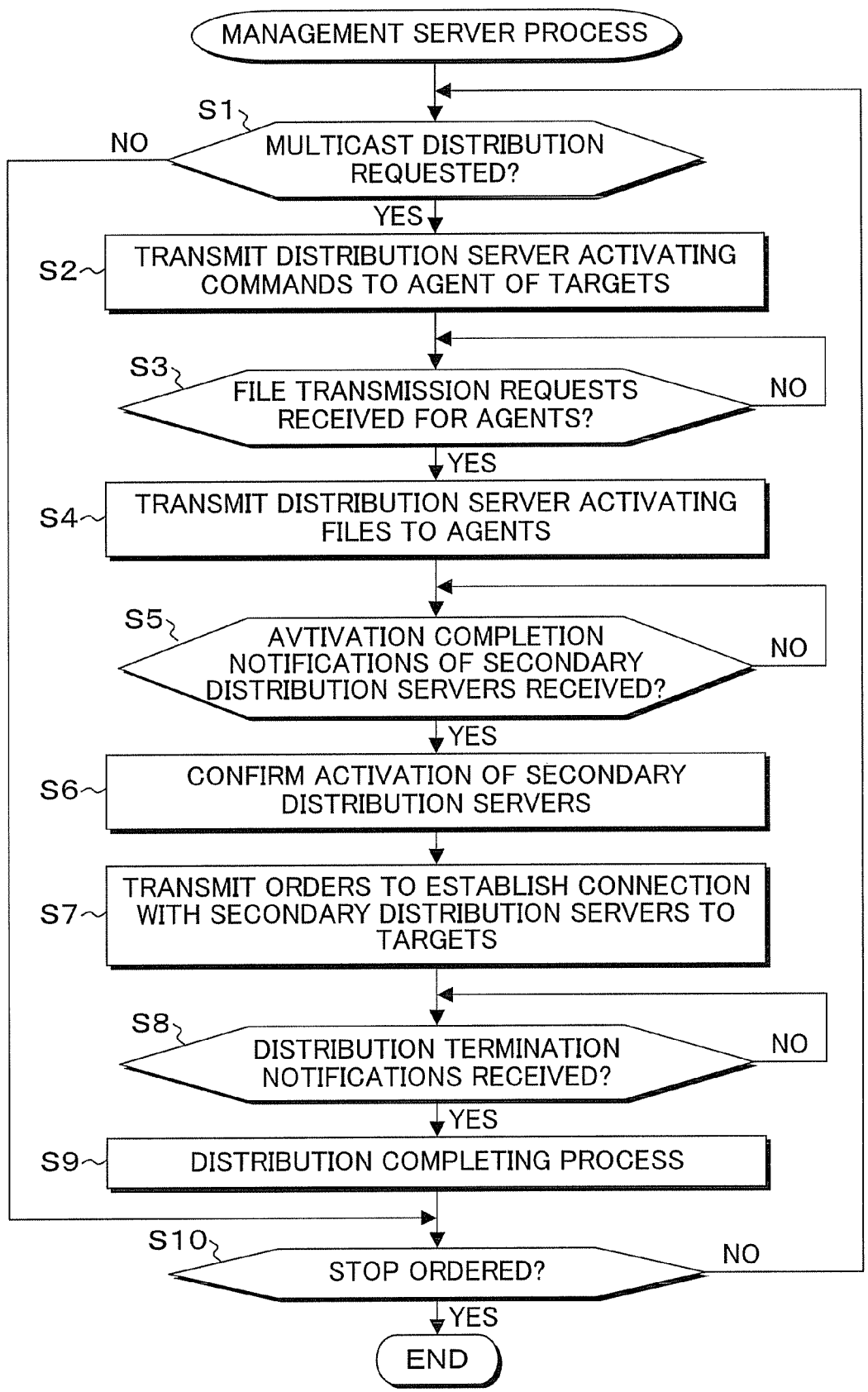
FIG. 7 is a flow chart showing a management server process of the present embodiment.

FIG. 7 is a flow chart showing a management server process of the present embodiment and will be explained as below with reference to FIGS. 3A and 3B. In FIG. 7, when the multicast distribution request by an operator or the like is determined in step S1, the management server process proceeds to step S2, the multicast group management table 40 shown in FIG. 4 is referenced, and the distribution server activating commands are transmitted to the agents of the targets, wherein the flag of the agent valid target is 1, in the segments connected via the router, i.e., the secondary segment 14-1 to 14-3 side. Subsequently, in step S3, when reception of the transmission request of the distribution server activating file from the agents to which the distribution server activating commands are transmitted is determined, the distribution server activating files are transmitted to the agents which are the request sources in step S4. Subsequently, whether all the activation completion notifications of the secondary distribution servers 28-1 to 28-3 have been received or not is checked in step S5. When they are received, activation of the secondary distribution servers 28-1 to 28-3 is confirmed in step S6; and, in step S7, the multicast group management table 40 of FIG. 4 is referenced, and the commands to establish connection with the secondary distribution servers are transmitted to the targets wherein the agents are not disposed, i.e., the targets wherein the flag of the distribution server activating agent is 0. Subsequently, whether the distribution termination notifications from the agents 26-1 to 26-3 have been received or not is checked in step S8. When reception of the distribution termination notifications from all the agents is determined, a distribution completion process is carried out in step S9, and the series of multicast distribution is terminated. Such processes of steps S1 to S9 are repeated until stop is ordered, for example, by log off, in step S10.

Figure 8:
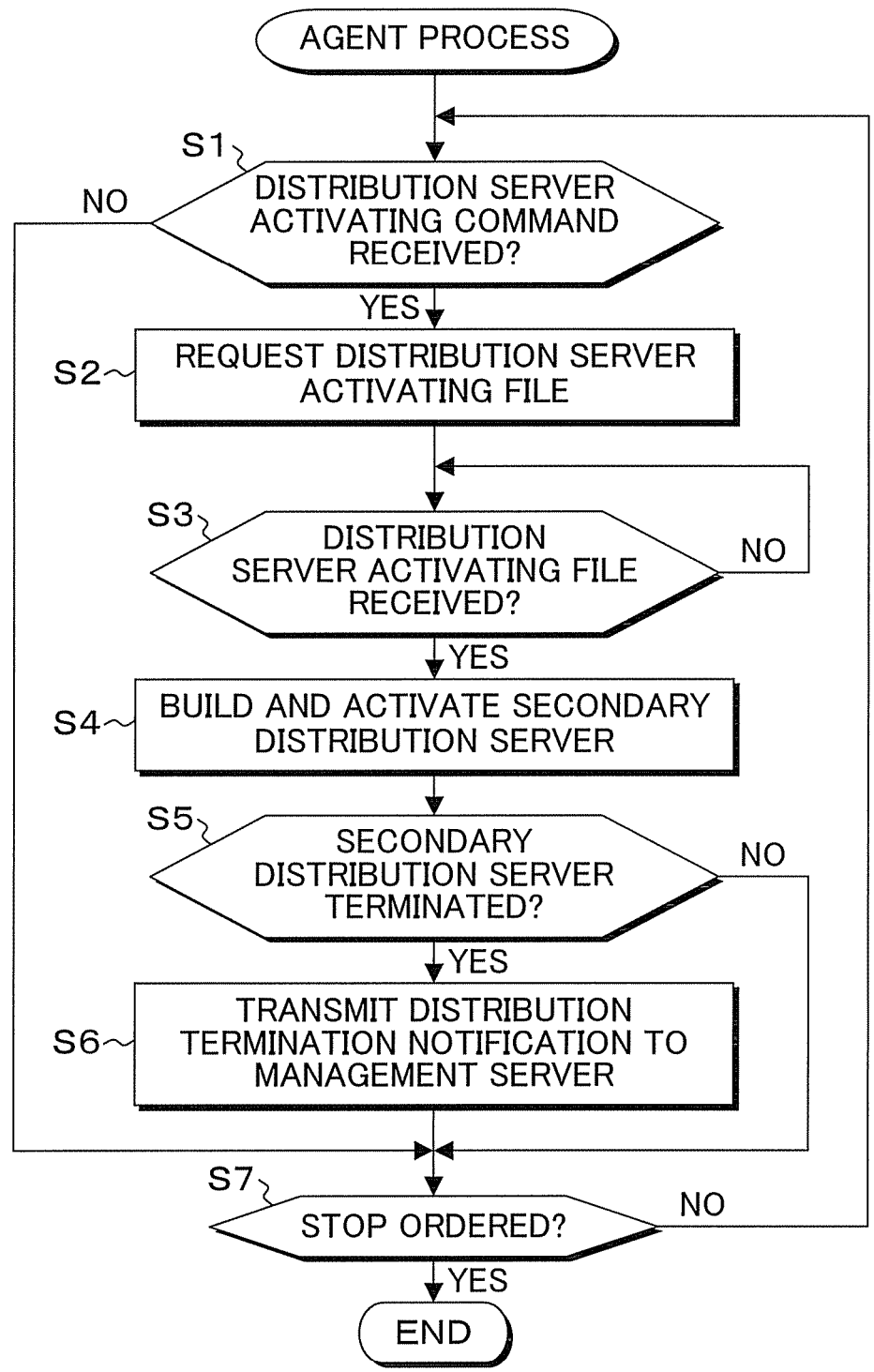
FIG. 8 is a flow chart showing an agent process of the present embodiment.

FIG. 8 is a flow chart showing an agent process of the present embodiment and will be explained as below, for example, by taking the agent 26-1, which operates on the target 24-11 of FIGS. 3A and 3B, as an example. In FIG. 8, when the agent 26-1 determines reception of the distribution server activating command from the management server 16 in step S1, the agent requests the distribution server activating file to the management server 16 in step S2. When reception of the distribution server activating file from the management server 16 is determined in step S3 with respect to this request, the secondary distribution server is built and activated on the same computer in step S4. Then, whether the secondary distribution server 28-1 has been terminated or not is checked in step S5. When the termination is determined, the distribution termination notification is transmitted to the management server 16 in step S6. Such processes of steps S1 to S6 are repeated until stop is ordered, for example, by log-off, in step S7.

Figure 9:
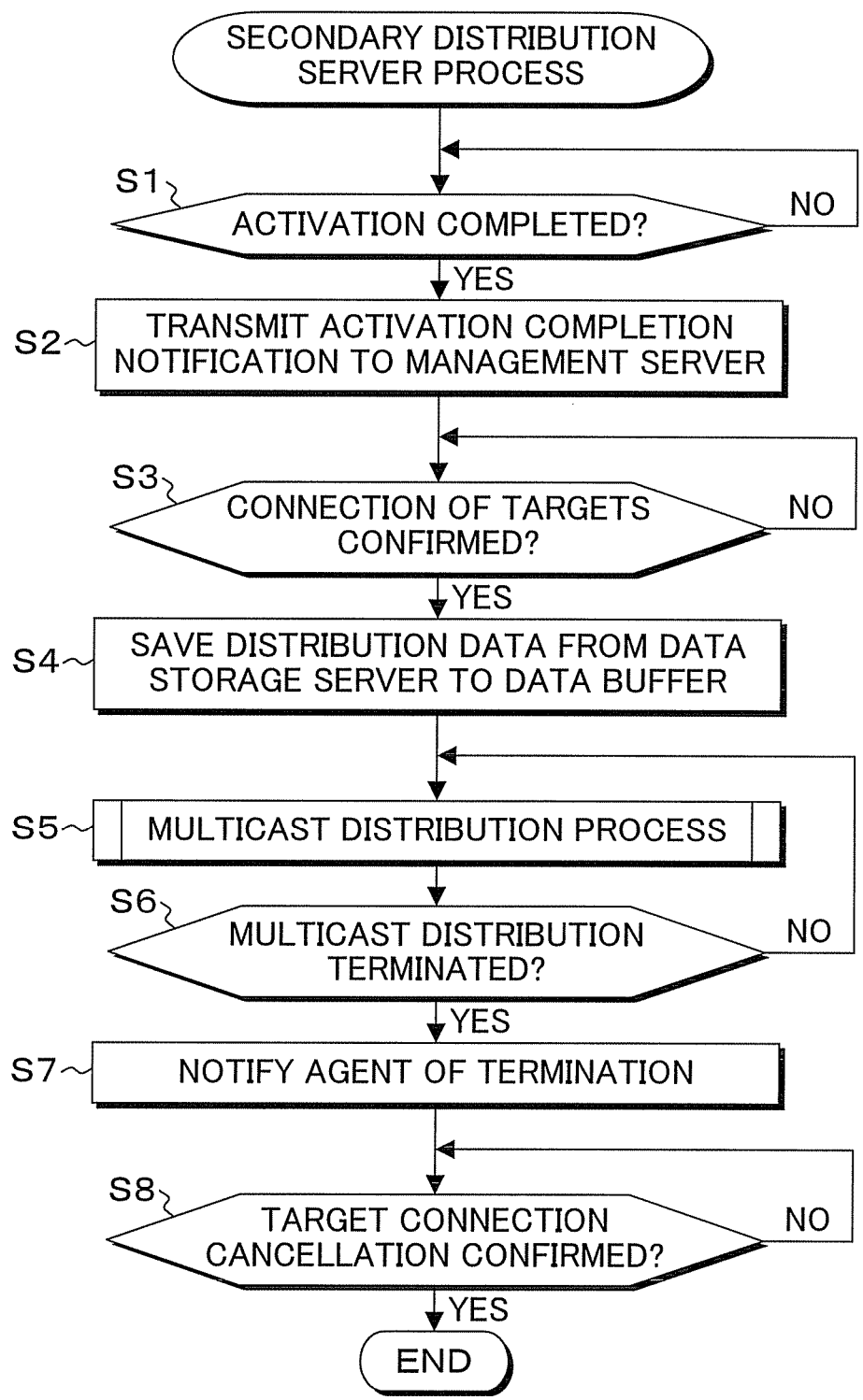
FIG. 9 is a flow chart showing a secondary distribution server process of the present embodiment.

FIG. 9 is a flow chart showing a secondary distribution server process of the present embodiment and will be explained as below by taking, for example, the secondary distribution server 28-1 of FIGS. 3A and 3B as an example. The secondary distribution server process of FIG. 9 is started by building and activation by the agent 26-1 on the same computer as that of the secondary distribution server 28-1. When it is determined in step S1 that activation of the secondary distribution server 28-1 has been normally completed, the process proceeds to step S2, and the activation completion notification is transmitted to the management server 16. Subsequently, when it is confirmed in step S3 that the targets 24-12 and 24-13 are connected to the secondary distribution server 28-1, the data which serves as the distribution object of multicast is acquired from the data storage server 20, which is provided in the primary segment 10 as well as the management server 16, and saved in the data buffer 30-1 in step S4. Subsequently, in step S5, a distribution process that distributes the data, which is temporarily saved in the data buffer 30-1, to the targets 24-12 and 24-13 by multicast is executed. When multicast distribution termination is determined in step S6, the agent 26-1 is notified of the termination in step S7, and cancellation of the connection of the targets 24-12 and 24-13 is confirmed in step S8 so as to terminate the series of processes.

Figure 10:
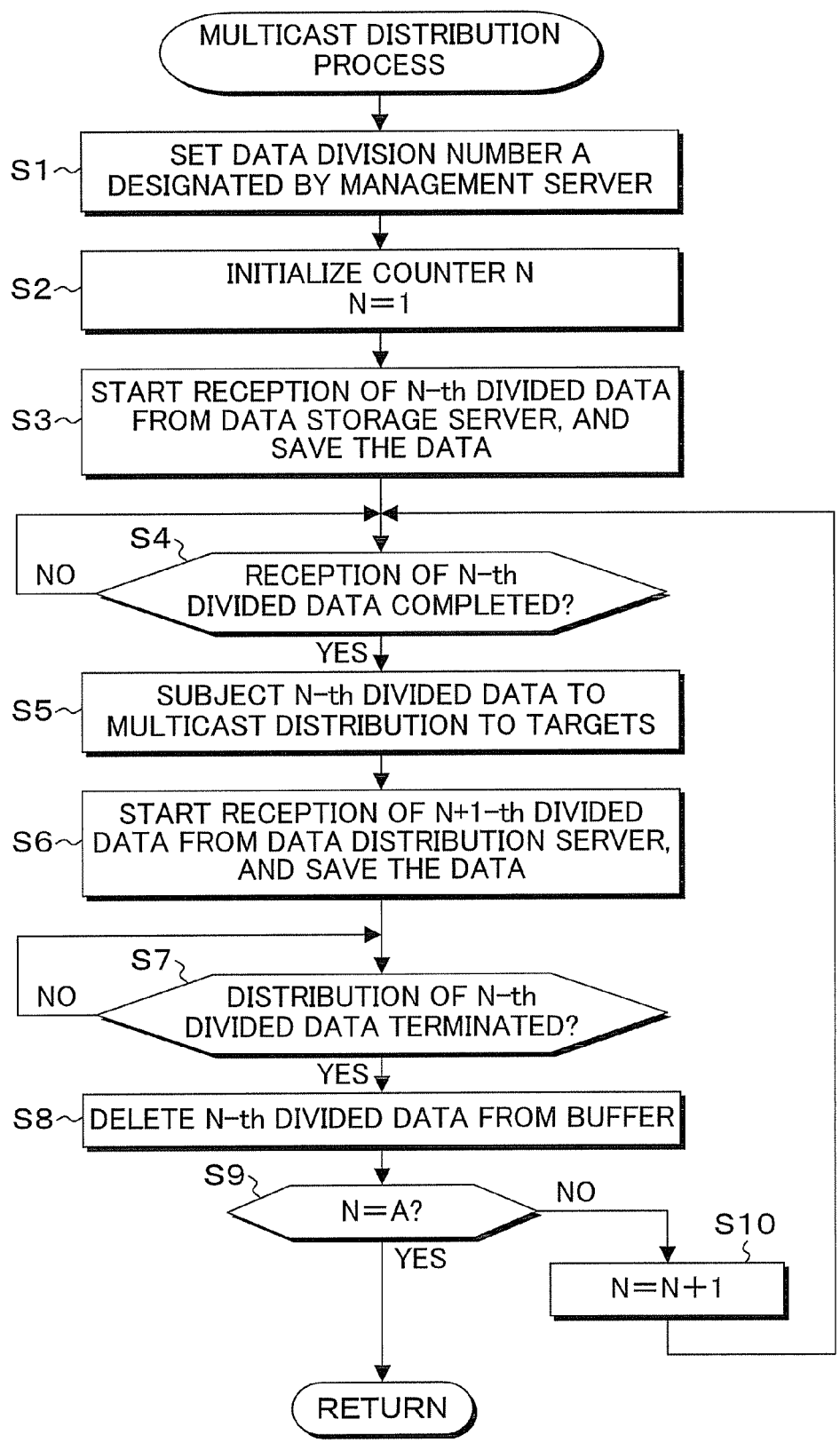
FIG. 10 is a flow chart showing details of a multicast distribution process in step S5 of FIG. 9.

FIG. 10 is a flow chart showing details of the multicast distribution process in step S5 of FIG. 9 and is characterized by carrying out multicast distribution by dividing the distribution data while maintaining synchronization with the targets. In FIG. 10, in the multicast distribution process of this embodiment, a data division number A designated by the management server 16 is set in step S1, and, subsequently, a counter N which indicates the transfer number of divided data is initialized to N=1 in step S2. Subsequently, in step S3, reception of N-th data, i.e., first divided data since N=1, from the data storage server 20 is started, and the data is saved in the data buffer 30-1. Subsequently, whether the reception of the first divided data has been completed or not is checked in step S4. When completion of the reception of the first data is determined, the first divided data is distributed to the targets 24-12 and 24-13 by multicast in step S5. During this distribution, in step S6, reception of N+1-th data, i.e., second divided data from the data storage server is started, and the data is saved in the data buffer 30-1. Subsequently, when distribution termination of the first divided data is determined in step S7, the first divided data is deleted from the data buffer 30-1 in step S8, and whether N representing the current number of already-distributed data has reached the division data number A, which is designated by the server in step S1, or not is checked in step S9. When the number N of the distributed divided data has not reached the division data number A, the counter N is incremented by one in step S10. Then, the process returns to step S4, reception completion of the second divided data, which is currently being received, is determined, the second divided data is similarly subjected to multicast distribution to the targets in step S5, these processes are repeated until the divided data number N reaches N=A, and the series of processes are terminated.

Figure 11:
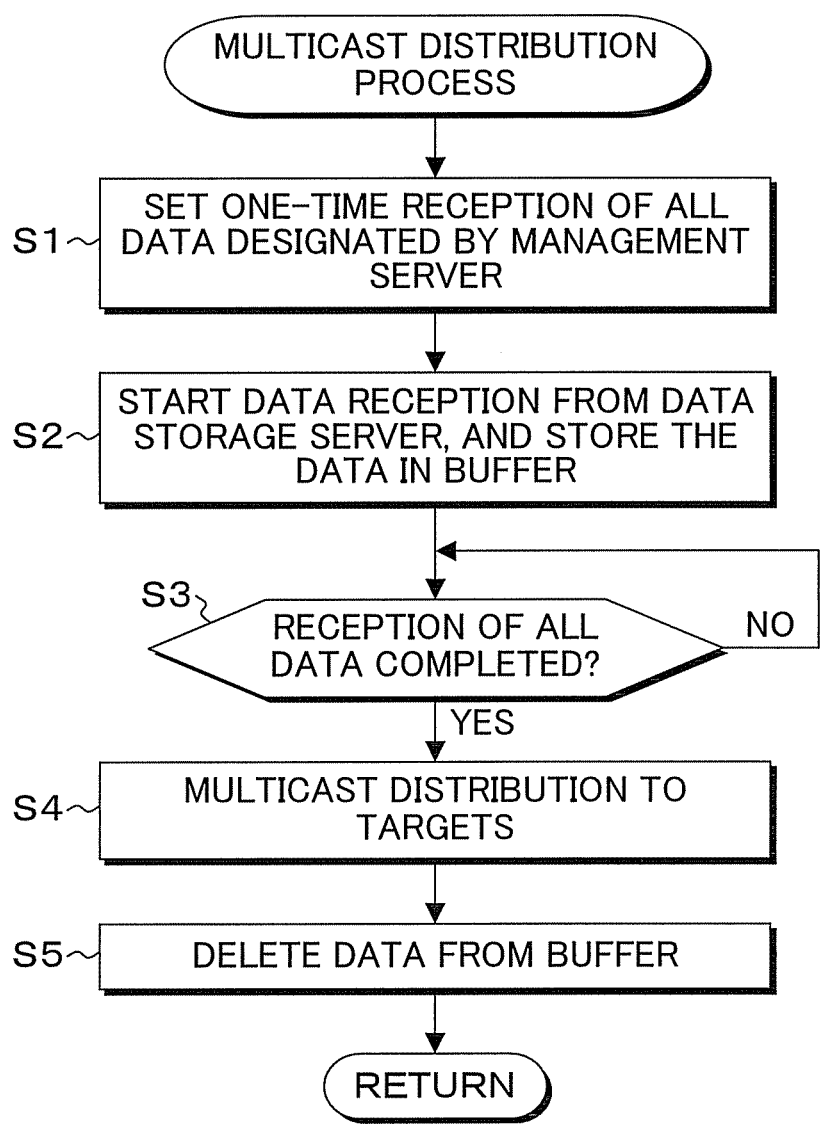
FIG. 11 is a flow chart showing details of another embodiment of the multicast distribution process in step S5 of FIG. 9.

FIG. 11 is a flow chart showing details of another embodiment of the multicast distribution process in step S5 of FIG. 9, and this embodiment is characterized in that multicast distribution to the targets is carried out after the data, which serves as the distribution object, is received from the data distribution server at one time and temporarily retained. In FIG. 11, first of all, one-time reception of all data designated by the management server 16 is set in step S1. In step S2, reception of the data from the data storage server 20 is started, and the data is stored in the data buffer 30-1. When reception completion of all the data is determined in step S3, multicast distribution of the data, which is saved in the data buffer 30-1, is carried out with respect to the targets 24-12 and 24-13 in step S4. When the multicast distribution is finished, the data is deleted from the data buffer 30-1 in step S5.

Figure 12:
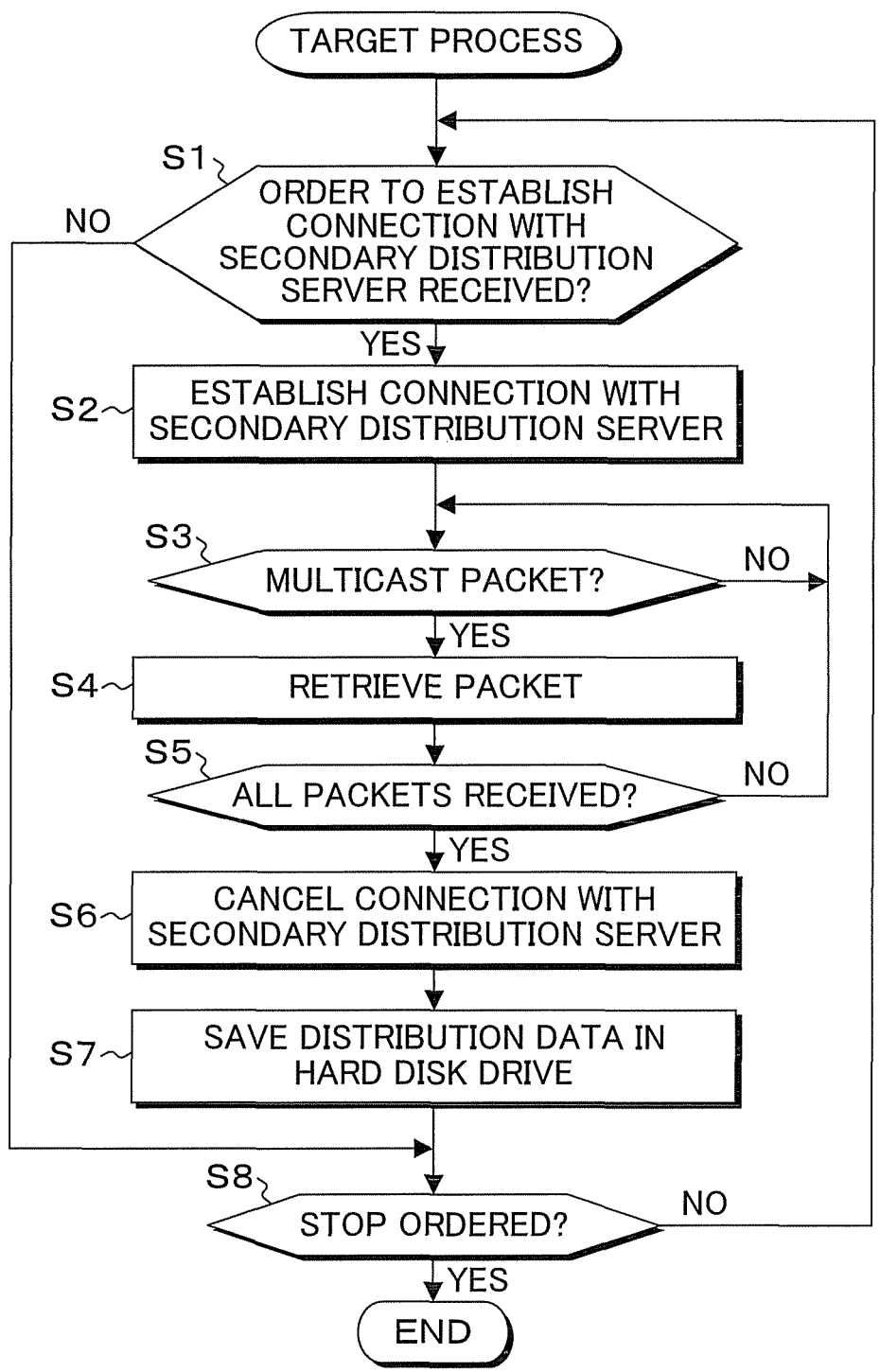
FIG. 12 is a flow chart showing a target process of the present embodiment.

FIG. 12 is a flow chart showing a target process of the present embodiment and will be explained as below when, for example, the target 24-12 connected to the secondary segment 14-1 of FIGS. 3A and 3B is taken as an example. In FIG. 12, in the target process, whether the command to establish connection with the secondary distribution server 28-1 has been received or not is determined in step S1; and, when this command is received, the connection with the secondary distribution server 28-1 is established in step S2. Subsequently, the address of the packet transmitted from the secondary distribution server 28-1 to the secondary segment 14-1 is checked in step S3. When it is determined to be a multicast packet having the inside-segment multicast address, the packet is retrieved in step S4, thereby acquiring the data thereof. 101 Subsequently, the processes from step S3 are repeated until reception of all packets is determined in step S5. When reception of all the packets is determined, the connection with the secondary distribution server 28-1 is cancelled in step S6, and the received distribution data is saved in the hard disk drive in step S7. Such processes of steps S1 to S7 are repeated until stop is ordered, for example, by log-off, in step S8.

Figure 13A:
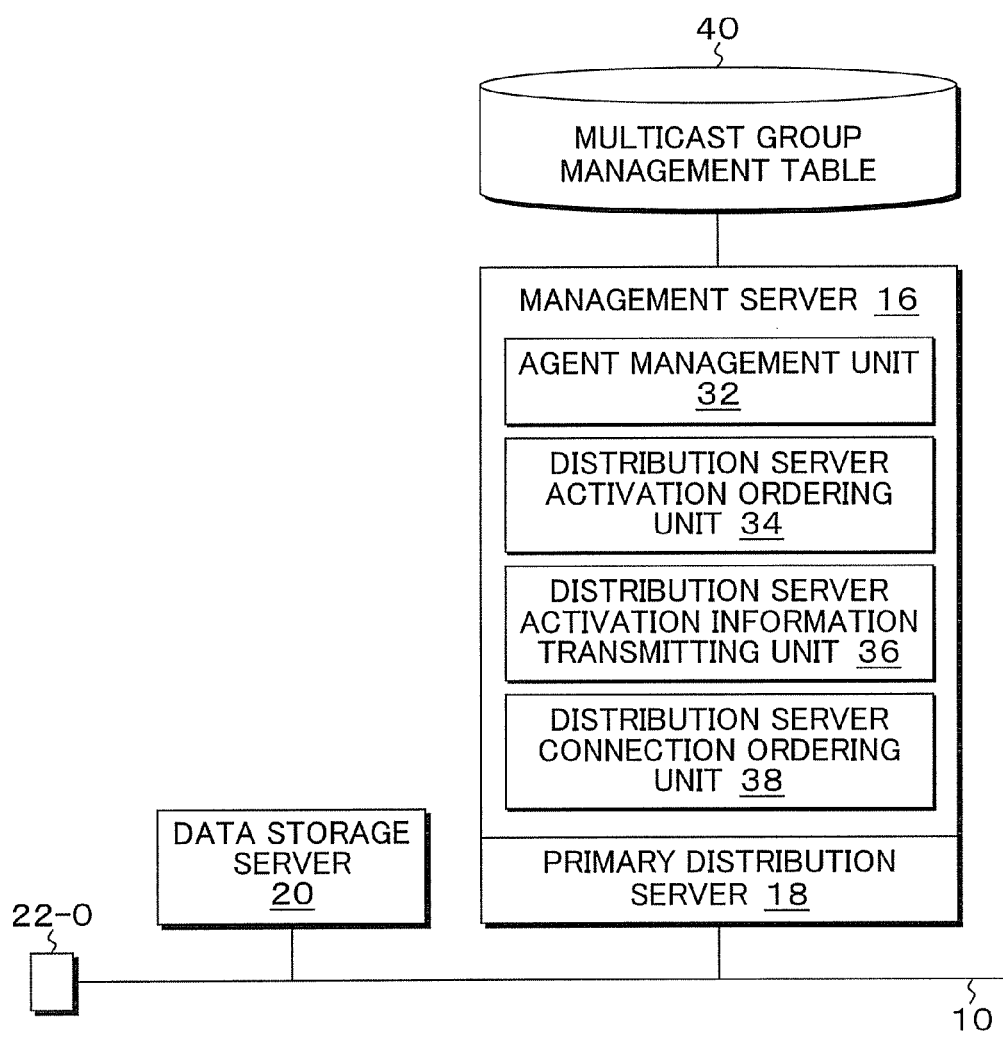
FIGS. 13A and 13B are block diagrams showing another embodiment of the present embodiment having a function of autonomously determining the target for distribution server activation among the targets of the same segment.
Figure 13B:
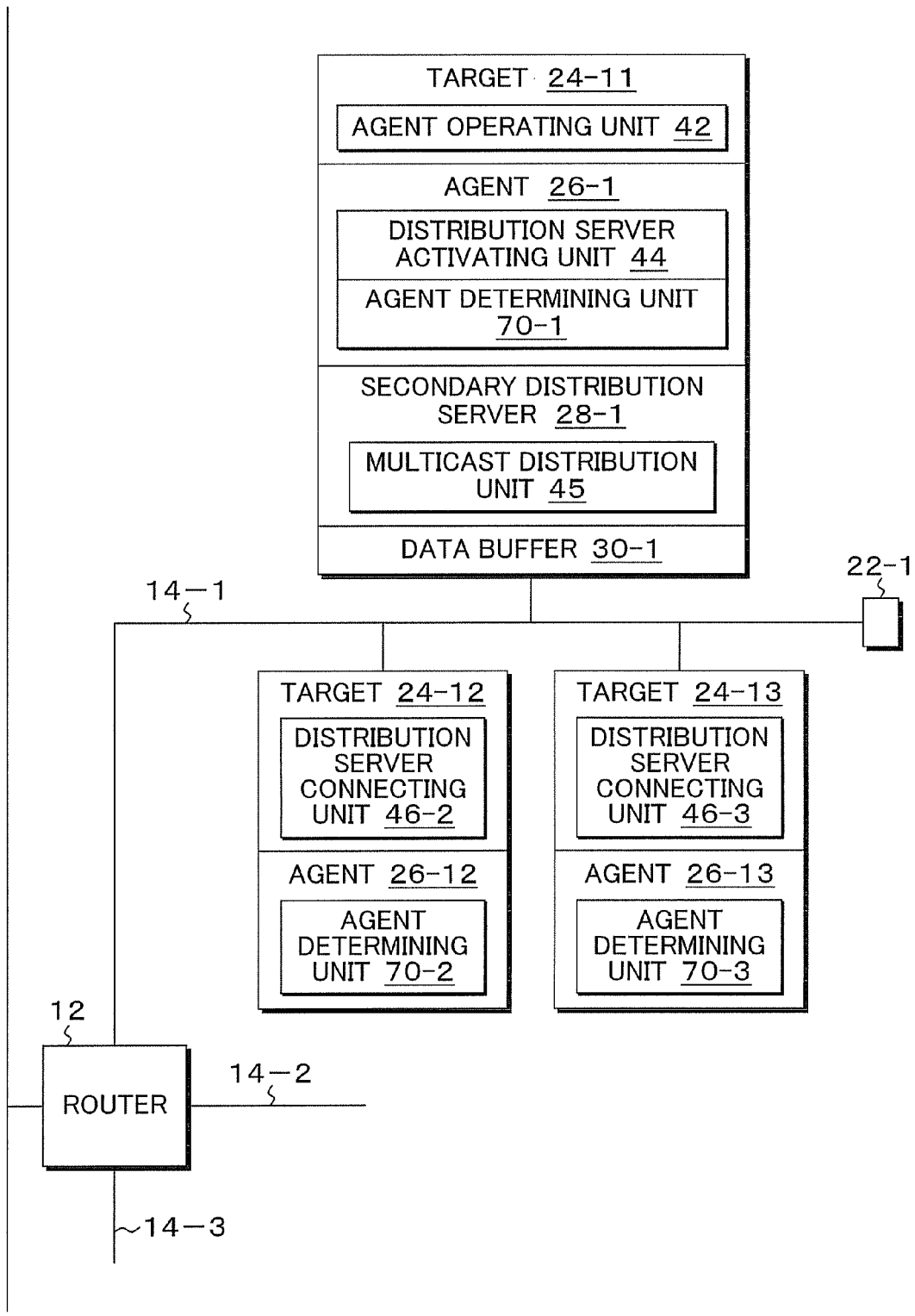

FIGS. 13A and 13B are block diagrams showing another embodiment, and this embodiment is characterized by having a function that autonomously determines the distribution server activating agent among the targets of the same segment. In FIGS. 13A and 13B, in each of the secondary segments 14-1 to 14-3 connected to the primary segment 10, in which the management server 16, the primary distribution server 18, and the data storage server 20 are disposed, via the router 12, for example, three targets 24-11 to 24-13 are disposed, as is representatively shown in the secondary segment 14-1. In the present embodiment, agents 26-11, 26-12, and 26-13 are present in all the three targets 24-11 to 24-13, which are connected to the secondary segment 14-1. Furthermore, all of the targets 24-11 to 24-13 are registered in the multicast group management table 40 as multicast distribution destinations with respect to multicast distribution requests with respect to the management server 16. When, in this manner, the agents 26-11 to 26-13 are present in all of the targets 24-11 to 24-13, which are disposed in the secondary segment 14-1, the distribution server activating agent that builds and activates the secondary distribution server is autonomously determined in the agents 26-11 to 26-13 side based on exchange of the resource information thereof. Therefore, the agents 26-11 to 26-13 operated respectively on the same computers as the targets 24-11 to 24-13 are provided with agent determining units 70-1 to 70-3. At appropriate agent determining timing, for example, upon activation of the targets, the agent determining units 70-1 to 70-3 exchange the resource information of the computers thereof mutually among the targets 24-11 to 24-13 and determine the agent that autonomously activates the distribution server. The computer resource information exchanged by the agent determining units 70-1 to 70-3 for determining the distribution server activating agent includes:

(1) CPU performance,
(2) memory capacity, and
(3) priorities set by a user in advance.

Then, the agent of the target having the highest CPU performance, the target having the largest memory capacity, or the target having the highest priority, which is set by the user in advance, becomes the distribution server activating agent, the management server is notified of the result of the autonomous determination, and the result is registered in the multicast group management table 40. Specifically, the configuration flag of the distribution server activating agent in the multicast group management table 40 shown in FIG. 4 is set to 1.

Figure 14:
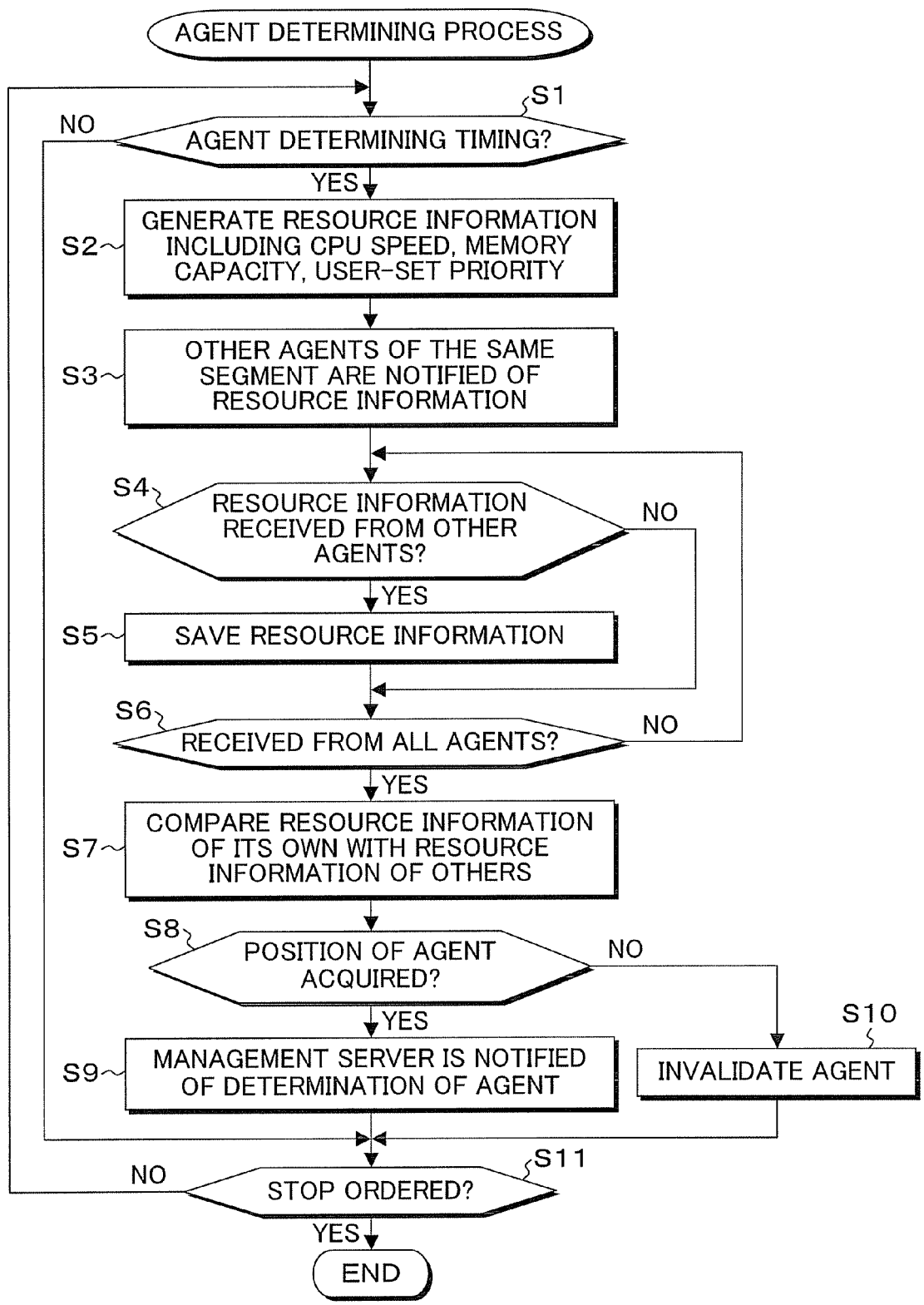
FIG. 14 is a flow chart showing an agent determining process in the embodiment of FIGS. 13A and 13B.

FIG. 14 is a flow chart showing an agent determining process in the embodiment of FIGS. 13A and 13B, and the process of the case in which, for example, the agent 26-11 provided in the target 24-11 is taken as an example will be described below. In FIG. 14, in the agent determining process, whether it is the agent determining timing such as computer activation or not is checked in step S1. When the agent determining timing is determined, the resource information including CPU speeds, memory capacities, user-set priorities, etc. is generated in step S2, and the other agents of the same segment are notified of the resource information in step S3. Subsequently, when reception of the resource information from the other agents is determined in step S4, the resource information is saved in step S5. When it is determined that the information has been received from all the agents in step S6, the resource information of its own and the resource information of the others are mutually compared in step S7. Subsequently, whether the position of the agent, i.e., the position as the agent that builds and activates the secondary distribution server has been acquired or not according to the comparison result of the resource information is checked in step S8. When acquired, the management server 16 is notified that this one has been determined as the agent in step S9, so as to set the flag of the of the corresponding distribution server activating agent to 1 as shown in the multicast group management table 40 of FIG. 4. On the other hand, when the position of the agent cannot be acquired in step S8, the agent is invalidated in step S10; and, even when the distribution server activating command is received from the management server 16 side, this command will be ignored. Such processes of steps S1 to S10 are repeated until stop is ordered, for example, by log-off, in step S11. Herein, as the agent determining timing of step S1, the timing at which the computer is activated and the target starts the connection to the secondary segment 14-1 is taken as an example. However, other than this, when the computer in which the agent that activates and builds the secondary distribution server is stopped due to failure or the like, this error may be recognized and set as the agent determining timing in step S1, the distribution server activating agent may be autonomously determined again among the targets effectively operating on the same segment, and the management server 16 may be notified of this. Also, the present embodiment provides the programs executed in the computers of the management server 16, the agent secondary distributing servers operated in the secondary segment-side connected via the router 12, and the targets serving as the multicast distribution objects provided in the multicast distribution system of FIGS. 2A and 2B. These programs have the contents shown in the flow charts of FIG. 7 to FIG. 10 and FIG. 14. Note that, regarding the data distribution of the targets 24-11 to 24-31 which build and activate the secondary distribution server 28-1 in the secondary segment 14-1 side, the data subjected to multicast distribution to the targets of the same segment is copied from the data storage server 20 of the management server 16 side to the data buffers 30-1 to 30-3. Therefore, when the targets 24-11 to 24-31 retrieve the copies of the data buffers 30-1 to 30-3 by themselves and save the copies in the hard disk drives of their own, the result is equivalent to the case in which the targets have undergone data distribution by multicast. Note that, in the above described embodiments, the secondary segments 14-1 to 14-3 connected to the primary segment 10 via the router 12 is taken as an example; however, the embodiments can be similarly applied to the case in which a larger number of columns of the secondary segments are disposed via a plurality of routers. The present multicast distribution system and method are not limited to the above described embodiments, include arbitrary modifications that include objects and advantages thereof, and are not limited by the numerical values shown in the above described embodiments.

What is claimed is:

1. A multicast distribution system distributing data to a plurality of targets, comprises:
    a network comprising a primary segment, in which a management server, a first distribution server, a plurality of secondary distribution servers and a data storage server are disposed, and a secondary segment, in which a plurality of targets connected to the primary segment via a router are disposed the plurality of secondary distribution servers disposed in the network and each of the plurality of targets is assigned to one of the plurality of secondary distribution servers, each of the plurality of secondary distribution servers including an agent program that enables each secondary distribution server to process multicast communication by receiving an activation request, the management server configured to receive a multicast distribution request, to transmit the activation request to the plurality of agent programs in the plurality of secondary distribution servers, and to confirm with each of the agent programs whether the each of the plurality of secondary distribution server is activated;
    an agent operating unit provided in any one of the plurality of targets disposed in the secondary segment and building and operating an agent;
    a distribution server activating unit provided in the agent and building and activating one of the secondary distribution servers on the target based on distribution server activating information, which is requested to and received from the management server, when a distribution server activating command is received from the management server;
    a distribution server connection ordering unit provided in the management server and transmitting a distribution server connection command to a plurality of the targets except for the target, in which the agent is built, when an activation completion notification is received from the one of the secondary distribution servers;
    a distribution server connecting unit provided in each of the plurality of targets and establishing connection with the one of the secondary distribution servers when the distribution server connection command is received from the management server; and
    a multicast distribution unit provided in each of the secondary distribution servers, acquiring and temporarily retaining data from the data storage server when connection of all of the plurality of targets is confirmed, and then distributing the data to the plurality of targets by multicast
    wherein when the management server receives the multicast distribution request, the management server transmits the activation request, confirms all of the plurality of secondary distribution server are activated, and requests the first distribution server to distribute date by multicasting.

2. The multicast distribution system according to claim 1, characterized in that the management server registers and manages agent management information representing the target, in which the agent is built, for each of one or a plurality of the secondary segment, recognizes the target, in which the agent is built, according to the agent management information when a multicast distribution request is received, and transmits the distribution server activating command to the target.

3. The multicast distribution system according to claim 2, characterized in that, when the agent is present on a plurality of the targets disposed in the secondary segment, the management server registers and manages the target, which is autonomously determined based on exchange of resource information of the plurality of targets, in the agent management information as a transmission destination target of the distribution server activating command.

4. The multicast distribution system according to claim 3, characterized in that the target having highest CPU performance, the target having a highest memory capacity, or the target having a highest priority set by a user in advance is determined as the transmission destination target of the distribution server activating command.

5. The multicast distribution system according to claim 1, characterized in that the primary distribution server is built and operated on a same computer as the management server.

6. The multicast distribution system according to claim 1, characterized in that the distribution server connecting unit is provided in each of the plurality of targets except for the target in which the agent is provided.

7. The multicast distribution system according to claim 1, wherein the multicast distribution unit repeats, up to last divided data, a process of sequentially acquiring divided data, which is obtained by dividing distribution data, from the data storage server, temporarily retaining the data, and then distributing the data to the plurality of targets by multicast.

8. The multicast distribution system according to claim 1, wherein the multicast distribution unit acquires all the data distributed from the data storage server, temporarily retains the data, and then distributes the data to the plurality of targets by multicast.

9. The multicast distribution system according to claim 1, characterized in that the router is a router not supporting multicast.

10. A multicast distribution method, comprising:
providing a primary segment, in which a management server, a first distribution server, and a data storage server are disposed, and a secondary segment, in which a plurality of targets connected to the primary segment via a router are disposed;
assigning each of the plurality of targets to a plurality of secondary distribution servers disposed in a network and each of the plurality of targets is assigned to one of the plurality of secondary distribution servers;
providing each of the plurality of secondary distribution servers with an agent program that enables each secondary distribution server to process multicast communication by receiving an activation request;
building and operating an agent in any one of the plurality of targets disposed in the secondary segment;
receiving, by the management server, a multicast distribution request to transmit an activation request to the plurality of agent programs in the plurality of secondary distribution servers;
transmitting a distribution server activating command from the management server to the agent and transmitting a distribution server activating file in response to a request from the agent so as to build and activate one of the secondary distribution servers on the target;
transmitting a command to establish connection with the one of the secondary distribution servers to the plurality of targets except for the target, in which the agent is provided, when the management server receives an activation completion notification from the secondary transmission server;
acquiring and temporarily retaining data from the data storage server when connection to all of the plurality of targets is confirmed by each of the secondary distribution servers and then distributing the data to the plurality of targets by multicast; and
confirming whether each of the agent program of the each of the plurality of secondary distribution server is activated; and
receiving by the management server the multicast distribution request, the management server transmitting the activation request, confirming all of the plurality of secondary distribution servers are activated, and requesting the first distribution server to distribute data by multicasting.

11. The multicast distribution method according to claim 10, wherein the building and activating the one of the secondary distribution servers, the management server registers and manages agent management information representing the target, in which the agent is built, for each of one or a plurality of the secondary segment, recognizes the target, in which the agent is built, according to the agent management information when a multicast distribution request is received, and transmits the distribution server activating command to the target.

12. The multicast distribution method according to claim 11, wherein in the one of the secondary distribution servers activating, when the agent is present on a plurality of the targets disposed in the secondary segment, the target, which is autonomously determined based on exchange of information of the plurality of targets, is registered and managed in the agent management information, which is provided in the management server, as a transmission destination target of the distribution server activating command.

13. The multicast distribution method according to claim 12, wherein in the one of the secondary distribution servers activating, the target having highest CPU performance, the target having a highest memory capacity, or the target having a highest priority set by a user in advance is determined as the transmission destination target of the secondary distribution server activating command.

14. The multicast distribution method according to claim 10, characterized in that the first distribution server is built and operated on a same computer as the management server.

15. The multicast distribution method according to claim 10, wherein the distribution server connection is provided in each of the plurality of targets except for the target in which the agent is provided.

16. The multicast distribution method according to claim 10, wherein sequentially acquiring divided data, which is obtained by dividing distribution data, from the data storage server, temporarily retaining the data, and then distributing the data to the plurality of targets by multicast is repeated up to last divided data.

17. The multicast distribution method according to claim 10, wherein all the data distributed from the data storage server is acquired, temporarily retained, and then distributed to the plurality of targets by multicast.

18. The multicast distribution method according to claim 10, wherein a router is a router not supporting multicast.

19. A network distribution system distributing data to a plurality of targets, comprising:
a network comprising a primary segment, in which a management server, a first distribution server, a plurality of secondary distribution servers and a data storage server are disposed, and a secondary segment, in which the plurality of targets connected to the primary segment via a router are disposed;
a plurality of secondary distribution servers disposed in a network and each of the plurality of targets is assigned to one of the plurality of secondary distribution server, each of the plurality of secondary servers including an agent program that enables each secondary distribution server to process multicast communication by receiving an activation request; and
a management server configured to receive a multicast distribution request, to transmit the activation request to the plurality of agent programs in the plurality of secondary distribution servers, and to confirm with each of the agent programs whether the each of the plurality of secondary distribution server is activated;
a multicast distribution unit provided in each of the secondary distribution servers, acquiring and temporarily retaining data from the data storage server when connection to all of the plurality of targets is confirmed, and then distributing the data to the plurality of targets by multicast,
wherein when the management server receives the multicast distribution request, the management server transmits the activation request, confirms all of the plurality of secondary distribution servers are activated, and requests the first distribution server to distribute data by multicasting.

20. A multicast distribution method, comprising:
providing a primary segment, in which a management server, a first distribution server, and a data storage server are disposed, and a secondary segment, in which a plurality of targets connected to the primary segment via a router are disposed;

assigning each of a plurality of targets to a plurality of secondary distribution servers disposed in a network and each of the plurality of targets is assigned to one of the plurality of secondary distribution servers;

providing each of the plurality of secondary distribution servers with an agent program that enables each secondary distribution server to process multicast communication by receiving an activation request;

receiving, by a management server, a multicast distribution request to transmit an activation request to the plurality of agent programs in the plurality of secondary distribution serves;

acquiring and temporarily retaining data from the data storage server when connection to all of the plurality of targets is confirmed by the secondary distribution servers and then distributing the data to the plurality of targets by multicast;

confirming whether each of the agent program of the each of the plurality of secondary distribution server is activated; and receiving by the management server the multicast distribution request, the management server transmitting the activation request, confirming all of the plurality of secondary distribution server are activated, and requesting the first distribution server to distribute data by multicasting.

* * * * *